United States Patent
Tasdizen

(10) Patent No.: US 10,861,167 B2
(45) Date of Patent: Dec. 8, 2020

(54) GRAPHICS PROCESSING SYSTEMS

(71) Applicant: Arm Limited, Cambridge (GB)

(72) Inventor: Ozgur Tasdizen, Cambridge (GB)

(73) Assignee: Arm Limited, Cambridge (GB)

( * ) Notice: Subject to any disclaimer, the term of this patent is extended or adjusted under 35 U.S.C. 154(b) by 88 days.

(21) Appl. No.: 16/279,849

(22) Filed: Feb. 19, 2019

(65) Prior Publication Data

US 2020/0265585 A1    Aug. 20, 2020

(51) Int. Cl.
| | |
|---|---|
| *G06T 7/231* | (2017.01) |
| *G06T 3/40* | (2006.01) |
| *G06T 7/11* | (2017.01) |
| *G06T 9/00* | (2006.01) |
| *G06T 7/00* | (2017.01) |

(52) U.S. Cl.
CPC ............ *G06T 7/231* (2017.01); *G06T 3/4007* (2013.01); *G06T 7/0002* (2013.01); *G06T 7/11* (2017.01); *G06T 9/00* (2013.01); *G06T 2207/10016* (2013.01)

(58) Field of Classification Search
CPC ......... G06T 7/231; G06T 9/00; G06T 3/4007; G06T 7/11; G06T 7/0002

USPC ........................................................ 382/236
See application file for complete search history.

(56) References Cited

U.S. PATENT DOCUMENTS

| | | | | |
|---|---|---|---|---|
| 2013/0301737 | A1* | 11/2013 | Kondow | H04N 19/13 375/240.16 |
| 2018/0288423 | A1* | 10/2018 | Vembar | H04N 19/503 |
| 2019/0238854 | A1* | 8/2019 | Yeung | H04N 19/139 |

* cited by examiner

*Primary Examiner* — Ayodeji O Ayotunde
(74) *Attorney, Agent, or Firm* — Vierra Magen Marcus LLP

(57) ABSTRACT

A graphics processing system includes a processing circuit operable to render or decode a sequence of frames and generate extrapolated frames by extrapolating object motion from rendered or decoded frames. The system also includes a processing circuit operable to extrapolate object motion from first and second rendered or decoded frames in the sequence to a later extrapolated frame. The processing circuit is also operable to test candidate motion vectors from a region of the extrapolated frame through a region of the first frame to a region of the second frame by comparing the region of the first frame with the region of the second frame. A similarity measure from the comparison is used to select a motion vector and an indication representative of the selected motion vector is stored.

19 Claims, 12 Drawing Sheets

GRAPHICS PROCESSING SYSTEMS

BACKGROUND

The technology described herein relates to graphics processing systems, and in particular to graphics processing systems that provide images for display for virtual reality (VR) and/or augmented reality (AR) head mounted display systems.

FIG. 1 shows an exemplary system on chip (SoC) graphics processing system that comprises a host processor comprising a central processing unit (CPU) 7, a graphics processing unit (GPU) 2, a display controller 5, and a memory controller 8. The exemplary graphics processing system may also comprise a video engine 1. As shown in FIG. 1, these units communicate via an interconnect 9 and have access to off-chip memory 3 via the memory controller 8. In this system, the graphics processing unit (GPU) 2 will render frames (images) to be displayed, and the display controller 5 will then provide the frames to a display panel 4 for display via a display interface.

In use of this system, an application 10 such as a game, executing on the host processor (CPU) 7 will, for example, require the display of frames on the display 4. To do this, the application 10 will submit appropriate commands and data to a driver 11 for the graphics processing unit (GPU) 2 that is executing on the CPU 7. The driver 11 will then generate appropriate commands and data to cause the graphics processing unit (GPU) 2 to render appropriate frames for display and to store those frames in appropriate frame buffers, e.g. in the main memory 3. The display controller 5 will then read those frames into a buffer for the display from where they are then read out and displayed on the display panel of the display 4.

The graphics processing system will be configured to provide frames for display, and the graphics processing unit (GPU) 2 will correspondingly be configured to render frames, at an appropriate rate, such as 30 frames per second.

An example of a use of a graphics processing system such as that illustrated in FIG. 1 is to provide a virtual reality (VR) or augmented reality (AR) head mounted display (HMD) system. In this case, the display 4 will be a head-mounted display of some kind. In a head mounted display operation, appropriate frames (images) to be displayed to each eye will be rendered by the graphics processing unit (GPU) 2 in response to appropriate commands and data from the application, such as a game, (e.g. executing on the CPU 7) that requires the display.

In such VR or AR systems, motion sickness caused by motion judder is experienced by some users when the rate of displaying frames on the display is lower than 60 frames per second, for example. However, rendering frames at a high enough rate (e.g. 90 frames per second) to mitigate motion sickness, requires the graphics processing system to have large processing, memory, power and cooling capabilities.

In mobile display and HMD systems, limitations in one or more of the processing capabilities of the graphics processing unit (GPU) 2, the memory transaction capabilities of the graphics processing system and the (e.g. head-mounted or mobile device) display system for sending rendered frames for display, the energy storage (e.g. battery) and cooling capacities of the (e.g. head-mounted or mobile device) display system (which may, for example, be affected by the amount of memory transactions performed), may not allow frames to be rendered at a high enough rate to prevent motion sickness, e.g. without suffering from latency problems.

To help mitigate at least some of these problems, a "frame rate up conversion" (FRUC) technique may be used. For a sequence of rendered frames, e.g. generated at 60 frames per second, intermediate frames are inserted between the generated frames, so to increase the frame rate for display, e.g. to 120 frames per second. This can help to reduce "judder" artefacts and provide a smoother virtual reality (VR) or augmented reality (AR) experience, for example, when the frames (including the intermediate frames) are displayed.

When using a HMD system, the intermediate frames can also be used to account for the head movement of the user. Such "timewarp" frames are transformed (e.g. relative to the previously rendered frame in the sequence) to take account of head orientation (pose) sensor data, e.g. detected by the HMD system. This helps to provide an appropriate image (frame) to the display based on the user's current direction of view.

The intermediate (e.g. timewarped) frames may be based on the other (e.g. adjacent) frames in the sequence of rendered frames. To generate these intermediate frames, the graphics processing unit (GPU) 2 may perform "motion estimation" using the rendered frames to predict the position of objects in the intermediate frames. This helps to account for local motion in the content of the frame, e.g. of objects, between frames in the sequence of rendered frames.

One motion estimation technique may be to predict the position of objects in an intermediate frame using the immediately adjacent rendered frames in the sequence of frames. Such a bidirectional motion estimation technique is illustrated in FIG. 2. Using a current rendered frame $F_n$ 12 and a previous rendered frame $F_{n-1}$ 13 in the sequence of frames that have been rendered by the graphics processing unit (GPU) 2, an intermediate frame $F_{n-0.5}$ 14 between the current frame $F_n$ 12 and the previous frame $F_{n-1}$ 13 is constructed to increase the display rate.

Taking a block 15 in the previous rendered frame 13, a matching block 16 is searched for in the current rendered frame 12, resulting in a forward motion vector 17 between the two. Similarly, for a block 18 in the current rendered frame 12, a matching block 19 is searched for in the previous rendered frame 13, resulting in a backward motion vector 20 between the two. These forward and backward motion vectors 17, 20 are then combined and used to predict where the corresponding blocks 21, 22 should appear in the intermediate frame 14. This allows the intermediate frame 14 to be encoded (and generated) using the combined motion vectors 17, 20. Subsequently the intermediate frame 14 may then be displayed by generating the intermediate frame 14 using the blocks of image data 15, 16, 18, 20 in the current and previous frames 12, 13 and the combined motion vectors 17, 20.

However, using this bidirectional technique can lead to problems. In particular, it may not always identify the "true" motion vectors, which are representative of the actual local motion of particular objects displayed in the frames. Instead, visually similar blocks relating to different objects may be associated with each other via the motion vectors, which can lead to overlap and hole problems. This can result in areas ("holes") of the intermediate frame possessing no motion vectors to associate them with corresponding areas of the current and previous rendered frames.

The Applicants believe that there remains scope for improvements to graphics processing systems, and in particular to graphics processing systems that provide images for display for virtual reality (VR) and/or augmented reality (AR) head mounted display systems.

BRIEF DESCRIPTION OF THE DRAWINGS

A number of embodiments of the technology described herein will now be described by way of example only and with reference to the accompanying drawings, in which.

DETAILED DESCRIPTION

Figure 1:
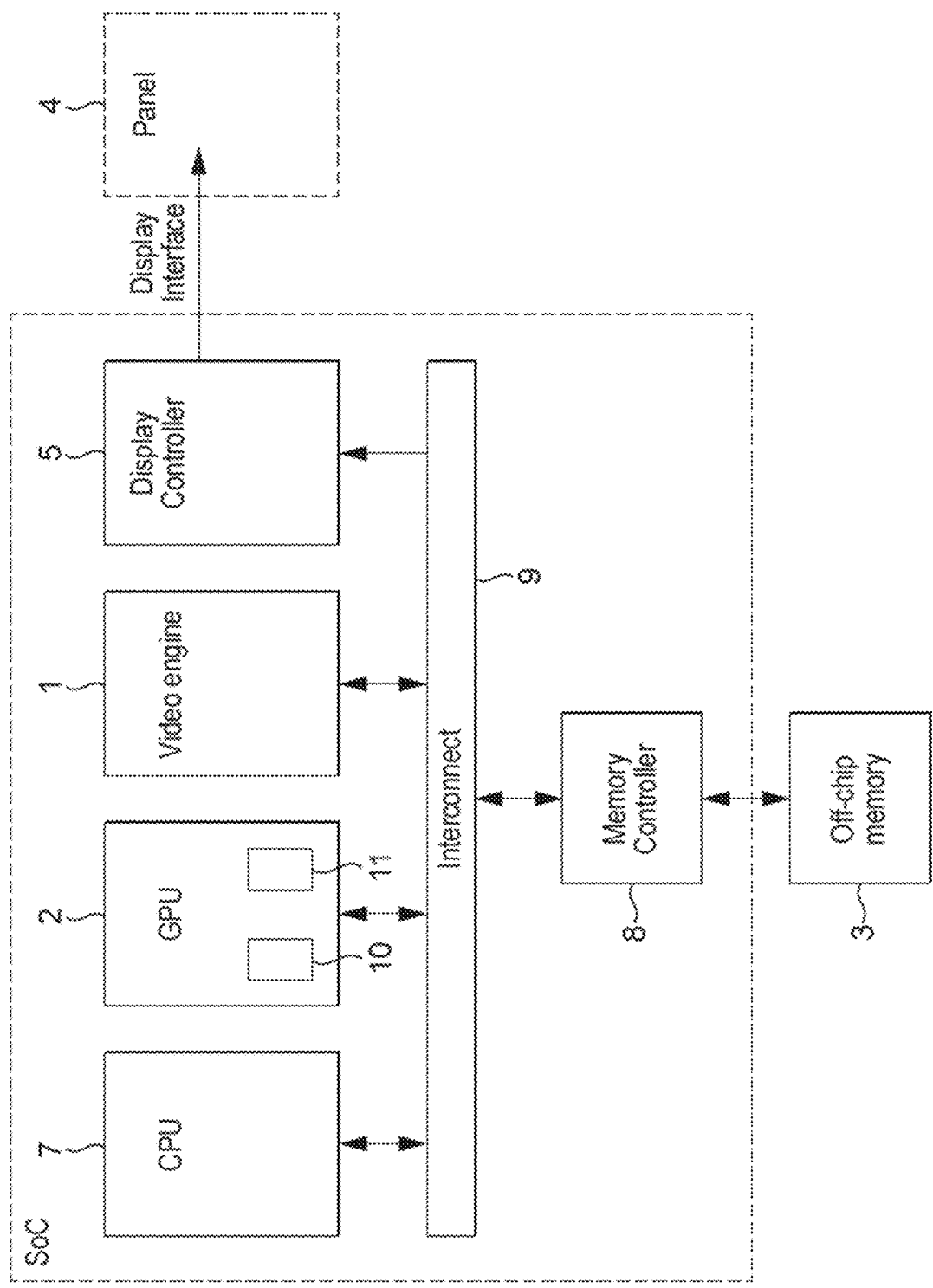
FIG. 1 shows an exemplary graphics processing system.
Figure 2:
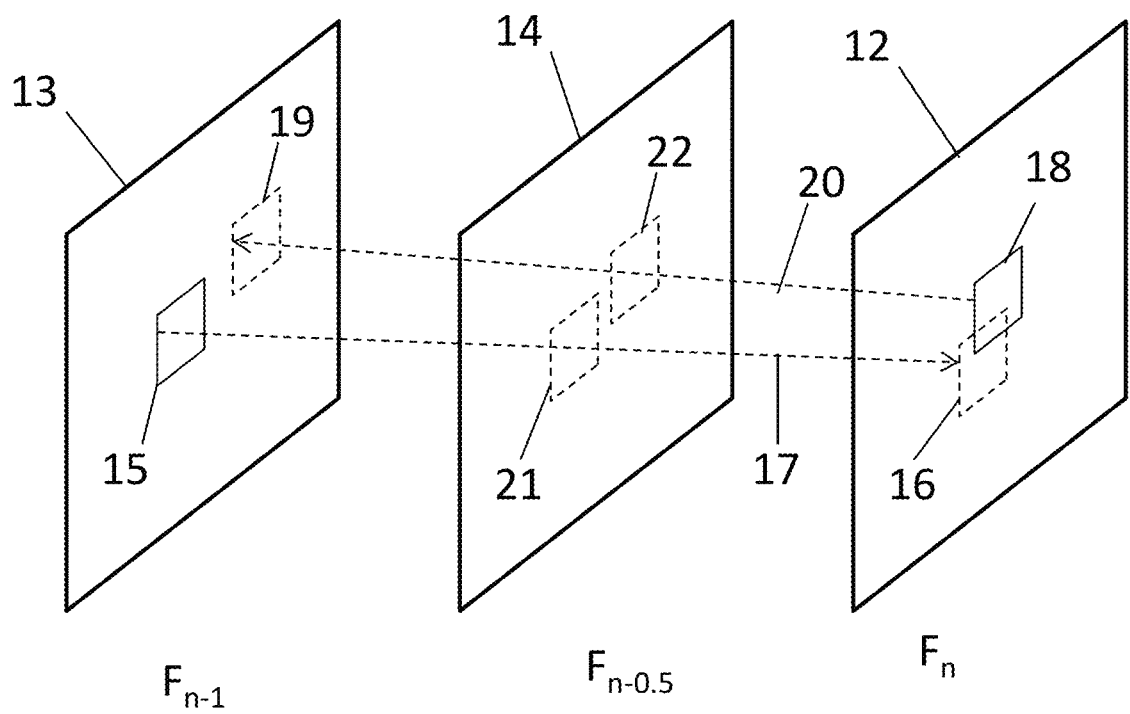
FIG. 2 shows a method of generating an interpolated frame using bilinear interpolation.

One embodiment of the technology described herein comprises a method of operating a graphics processing system that renders or decodes a sequence of frames each representing a view of a scene of one or more objects, and generates extrapolated frames for inclusion in the sequence of rendered or decoded frames by extrapolating object motion from rendered or decoded frames of the sequence of frames, the method comprising:

generating an extrapolated frame for inclusion in the sequence of frames by extrapolating object motion from first and second rendered or decoded frames in the sequence of rendered or decoded frames to the extrapolated frame, wherein the extrapolated frame is to be included in the sequence of rendered or decoded frames after the first and second frames, by:

for each of one or more regions of a set of regions that the extrapolated frame is divided into for the purpose of generating the extrapolated frame:

determining a motion vector to use for generating the region of the extrapolated frame from the first and second frames by, for each of one or more candidate motion vectors extending from the region of the extrapolated frame through a region of the first frame to a region of the second frame:

comparing the region of the first frame intersected by the candidate motion vector with the region of the second frame intersected by the candidate motion vector;

determining a measure of the similarity of the region of the first frame intersected by the candidate motion vector to the region of the second frame intersected by the candidate motion vector using the comparison;

selecting one of the tested candidate motion vectors as the motion vector to use when generating the region of the extrapolated frame from the first and second frames based on the determined similarity measures for the tested candidate motion vectors; and storing an indication representative of the selected candidate motion vector for use when generating the extrapolated frame from the first and second frames.

Another embodiment of the technology described herein comprises a graphics processing system comprising:

a processing circuit operable to render or decode a sequence of frames each representing a view of a scene of one or more objects, and generate extrapolated frames for inclusion in the sequence of rendered or decoded frames by extrapolating object motion from rendered or decoded frames of the sequence of frames; and a processing circuit operable to generate an extrapolated frame for inclusion in the sequence of frames by extrapolating object motion from first and second rendered or decoded frames in the sequence of rendered or decoded frames to the extrapolated frame, wherein the extrapolated frame is to be included in the sequence of rendered or decoded frames after the first and second frames, by:

for each of one or more regions of a set of regions that the extrapolated frame is divided into for the purpose of generating the extrapolated frame:

determining a motion vector to use for generating the region of the extrapolated frame from the first and second frames by, for each of one or more candidate motion vectors extending from the region of the extrapolated frame through a region of the first frame to a region of the second frame:

comparing the region of the first frame intersected by the candidate motion vector with the region of the second frame intersected by the candidate motion vector;

determining a measure of the similarity of the region of the first frame intersected by the candidate motion vector to the region of the second frame intersected by the candidate motion vector using the comparison;

selecting one of the tested candidate motion vectors as the motion vector to use when generating the region of the extrapolated frame from the first and second frames based on the determined similarity measures for the tested candidate motion vectors; and storing an indication representative of the selected candidate motion vector for use when generating the extrapolated frame from the first and second frames.

The technology described herein relates to a graphics processing system that generates an extrapolated frame by extrapolating objects based on their motion (e.g. translation and/or rotation) from previously rendered or decoded frames, e.g. and in an embodiment, such that moving objects shown in the previously rendered or decoded frame are shown appropriately translated, rotated and/or scaled in the extrapolated frame based on their motion.

In the technology described herein, when an extrapolated frame is to be generated based on object motion from rendered (e.g. "application") or decoded (e.g. video) frames in a sequence of such rendered or decoded frames, one or more candidate motion vectors are tested. These candidate motion vector(s) are tested to determine which motion vector direction may represent how object(s) represented in the rendered or decoded frames have moved (or retained their position) such that they end up at the position of (and therefore should be represented (and, e.g., displayed) in) the region of the extrapolated frame for which the one or more candidate motion vectors are being tested. This is done for each of one or more regions that the extrapolated frame is divided for the purpose of generating the extrapolated frame.

Using these one or more candidate motion vectors, each motion vector points from the region of the extrapolated frame to a respective region in both a first rendered or decoded frame and a second rendered or decoded frame. The motion vector thus intersects these regions in the first and second frames. The first and second frames are earlier rendered or decoded frames in the sequence of frames, such that the extrapolated frame is to be included as a later frame in the sequence (and may thus, for example, be displayed) after these frames. In an embodiment the second frame is earlier in the sequence of frames than the first frame.

The regions in the first and second frames, pointed to by a candidate motion vector, are compared to determine whether they are similar to each other (or not) and a measure of their similarity is determined. This comparison and the determined similarity measure helps to identify when the object(s) represented at that region in the second frame have moved to the region in the first frame along the (reverse of the) candidate motion vector, such that they may continue to move to the region in the extrapolated frame for which the one or more candidate motion vectors are being tested. This may then determine that the candidate motion vector represents the (e.g. "true") object motion of the object(s) represented in the first and second frames through to the region of the extrapolated frame.

One of the tested candidate motion vectors is selected, based on the determined similarity measures, to be used when generating the region of the extrapolated frame from the first and second frames.

To aid the generation of the extrapolated frame, an indication that is representative of the selected motion vector (from the perspective of the extrapolated frame through the first frame to the second frame) is stored for each region of the extrapolated frame. This selected motion vector may then be used for the purpose of generating the region of the extrapolated frame for which the object motion is being determined, e.g., and in an embodiment, using the regions along the selected motion vector in the first and second frames.

Providing additional, extrapolated frames that can be constructed using object motion from other previously rendered or decoded frames in the sequence of frames helps to increase the number of frames in the sequence and thus the rate at which frames are able to be displayed, but without the need to actually render or decode, store and transmit the additional frames, thus helping to reduce the processing, memory, power and cooling demands on the graphics processing system, while helping to address the problem of motion sickness experienced by some users when the frame display rate is too low.

Generating an extrapolated frame, that is to be included in the sequence of frames after the rendered or decoded frames that have been used to determine the object motion in order to generate the extrapolated frame, rather than generating an intermediate interpolated frame (which is inserted between the rendered or decoded frames used to determine the object motion), helps to reduce the latency when outputting frames for display. This is because the extrapolated frame is to be included in the sequence after the rendered or decoded frames that have been used to determine the object motion for the generation of the extrapolated frame, and so the rendered or decoded frames that that have been used to determine the object motion for the generation of the extrapolated frame are able to be output first for display (e.g. while the extrapolated frame is being generated), before the extrapolated frame to be displayed.

Furthermore, determining the object motion from the perspective of the extrapolated frame, e.g. rather than using bilinear interpolation for an intermediate frame, allows the determination of the object motion to be made in a single (rather than double) pass. Again, this helps to reduce the processing, memory, power and cooling demands on the graphics processing system.

Using this perspective, with the motion vector(s) each being determined from a region of the extrapolated frame towards the earlier first and second frames in the sequence, also helps to address the hole and overlap problem associated with bilinear interpolation. This is because, using the process of the technology described herein, the object motion may be determined for all the regions of the extrapolated frame, so no region of the extrapolated frame is left without having its object motion determined therefor, as can happen when performing bilinear interpolation for an intermediate frame.

The first and second frames may be any suitable and desired frame (image) that represents a view of a scene. Thus in an embodiment the sequence of rendered or decoded frames is being rendered or decoded to display a sequence of images to a viewer.

In an embodiment, the second frame represents a view of the scene that the first frame represents a view of, but at an earlier point in time. Thus, in an embodiment, the second frame is an earlier frame, in the sequence of frames that is being generated, compared with the first frame. In this case, the second, earlier frame may be any suitable and desired frame (image) that is rendered or decoded (for display) at an earlier time than the first frame.

Thus, in an embodiment, the second frame and the first frame are (in an embodiment consecutive) frames in a sequence of successive frames (representing successive views of a scene). The second frame may be the frame that immediately precedes the first frame in the sequence of frames, or an earlier frame in the sequence of frames.

The extrapolated frame to be generated by the process of the technology described herein is to be included in the sequence of frames as an additional frame in the sequence of frames after (later than) the first (and second) frame (e.g. when the frames are displayed), such that were an extrapolated frame to be added between each pair of frames (and, in an embodiment, this is what is done), the frame (e.g. display) rate would be doubled. Thus, for example, when an extrapolated frame is generated, using the first and second frames, a previous extrapolated frame may (and, in an embodiment, has) already have been generated between the first and second frames (e.g. using the second frame and an earlier, third frame).

In an embodiment the extrapolated frame is generated so as to be included in the sequence of frames at a position half way (e.g. half the time period) between successive rendered or decoded frames. In some embodiments only a single extrapolated frame is generated so as to be inserted (e.g. half way) between (e.g. each pair of) successive rendered or decoded frames. However, in other embodiments plural extrapolated frames may be generated so as to be inserted (e.g. at regular intervals) between (e.g. each pair of) successive rendered or decoded frames. This may allow the frame (e.g. display) rate to be tripled or quadrupled, for example.

In one embodiment, the sequence of rendered or decoded frames and the generated extrapolated frames comprises the final sequence of frames to be output, e.g. for display. A rendered or decoded frame in a sequence of frames may thus represent the final view of a scene to be displayed. A (each) (e.g. rendered or decoded) frame (a region of which is to be compared) may comprise an array of data elements (sampling positions) (e.g. pixels), for each of which appropriate data (e.g. a set of colour values) is stored.

In one embodiment, the sequence of rendered or decoded frames and the generated extrapolated frames comprises a sequence of (e.g. input) layers from which a sequence of (e.g. output) frames are to be generated (e.g. composited), which may then be output (e.g. for display). A (e.g. input) layer in a sequence of layers may thus represent an individual layer of a view of a scene that, for example, is to be combined with one or more other (input) layers (e.g. which themselves represent a layer of a view of a scene) to form a final frame, that may then be output for display.

Each of the individual (e.g. input) layers may be rendered or decoded, or generated separately and then combined. The individual layers may form any suitable and desired layers for combining into a frame for display. For example, the layers may comprise one or more of a gaming layer, a window, a user interface (UI) layer and a system layer.

A (each) frame may be generated as desired. The or each frame is, in an embodiment, generated (rendered, decoded or processed) by a graphics processing unit (a graphics processor) of the graphics processing system, but it could also or instead be generated or provided by another component or components of the overall graphics processing system, such as a CPU or a video processor, if desired. Thus, the sequence of rendered or decoded frames may be generated as a sequence of frames that are rendered by the graphics processing system for display, or the sequence of rendered or decoded frames may be generated from encoded (e.g. video) data that is decoded by the graphics processing system to produce the sequence of decoded frames.

The or each frame may be stored in (written to) memory for subsequent use as desired. For example, the or each frame may be stored in a frame buffer in memory, from where it may then be read for further processing and/or for display by a display controller of the graphics processing system.

The memory where the or each frame is stored may comprise any suitable memory and may be configured in any suitable and desired manner. For example, it may be a memory that is on chip with the graphics processing unit (GPU) or it may be an external memory. In an embodiment it is an external memory, such as a main memory of the graphics processing system. It may be dedicated memory for this purpose or it may be part of a memory that is used for other data as well.

A (each) extrapolated frame is divided into a set of one or more regions for the purpose of generating the extrapolated frame. The set of regions may be any suitable and desired set of regions of the frame. The extrapolated frame(s) are, in an embodiment, divided (partitioned) into a set of plural identifiable smaller regions, each representing a part of (some but not all of) the overall extrapolated frame. The subdivision of the extrapolated frame(s) may be done as desired, and each region may represent any suitable and desired region (area) of the overall extrapolated frame.

In an embodiment, an (and the) extrapolated frame is divided into an array of regularly sized and shaped regions. In an embodiment this is in the form of rectangular (and, in an embodiment, square) regions, and the one or more regions of the extrapolated frame for which motion vector(s) are to be determined comprise one or more of these regularly sized and shaped regions.

In an embodiment, each region represents a different part of the overall extrapolated frame (although the regions could overlap if desired). Each region should represent an appropriate portion (area) of the extrapolated frame (e.g. a plurality of data elements within the array).

As will be outlined further below, each of the one of more regions of the extrapolated frame may be further sub-divided into a plurality of smaller sub-regions, which (as for the regions) may be performed, sized and shaped as desired.

Similarly, the (e.g. first and second) frames in the sequence of frames may be divided into a set of regions (and, e.g., sub-regions) for the purpose of generating the frames. Then, for example, the regions of the first and second frames that are compared may comprise one or more of these regions.

Suitable region (or sub-region) sizes would be, e.g., 2×2, 4×4, 8×8, 16×16, 32×8, 32×16, 32×32, 64×16, 64×32 or 64×64 data elements in the data array. Other arrangements would, of course, be possible.

In an embodiment, each such regularly sized and shaped region (or sub-region) corresponds to a "tile", e.g. that a processing stage, e.g. graphics processing unit (GPU), of the graphics processing system produces as its output. Thus, in an embodiment, the first and second frames are (each) divided into (and rendered and/or decoded as) a set of plural "tiles" (e.g. that the graphics processing unit (GPU) produces as its output). The regions (or sub-regions) of the (and each) extrapolated frame, and the regions of the first and second frames being compared, may also (but do not necessarily) correspond to (e.g. one or more of) these tiles.

In order to determine the motion vector to assign to each of the one or more regions of the extrapolated frame, one or more candidate motion vectors are tested. These candidate motion vectors project (linearly) from the region of the extrapolated frame for which the motion vectors are being tested, back through the first frame to the (earlier) second frame. A region in each of the first and second frames is defined, at (e.g. around) the location to which each candidate motion vector points (extends through and intersects these frames), for the purpose of comparing these regions (i.e. to see when these regions match to each other in the first and second frames).

The one or more candidate motion vectors to be tested may be determined (e.g. defined or selected) in any suitable and desired way. There may be only a single candidate motion vector tested for a (or each) region of the extrapolated frame (e.g. when it is determined from the determined similarity measure that the testing of the candidate motion vectors can be terminated, as will be discussed below).

However, in an embodiment, a plurality of candidate motion vectors are tested for a or each region of the extrapolated frame. This helps to enable a number of regions (corresponding to the plurality of candidate motion vectors) in each of the first and second frames to be compared with each other. This helps to assess which pair of regions in the first and second frames are (e.g. most) similar to each other, e.g. in order to determine the (e.g. "true") object motion from the second frame through the first frame to the region of the extrapolated frame for which the candidate motion vector(s) are being tested. The Applicants have appreciated that testing plural candidate motion vectors helps to detect different types of object motion that may be present between the first and second frames, e.g. translations, rotations and zooming in or out.

In one embodiment the one or more candidate motion vectors comprises the "null" direction. The null motion vector (which has components 0,0 in the plane of the extrapolated frame) points to the same region in the first and second frames as the region of the extrapolated frame for which the candidate motion vector(s) are being tested. This gives a default starting point for testing candidate motion vectors, e.g. based on the assumption that there may be no or little object motion between the first and second frames.

In an embodiment the one or more candidate motion vectors also comprise one or more (e.g. a plurality of) candidate motion vectors around (e.g. centred on) the null motion vector (pointing from the same location in the extrapolated frame to different locations in the first and second frames). Such a "full" search, comparing different regions of the first and second frames with each other helps to identify the (e.g. most) similar pair of regions in the first and second frames that may be used to determine the (e.g. "true") object motion from the second frame through the first frame to the region of the extrapolated frame.

The motion vectors around the null motion vector may be shifted from the null motion vector by any suitable and desired distance, and in any suitable and desired direction. The motion vectors may, for example, be shifted from the null motion vector by an integer number of data elements (e.g. pixels) in the first and/or second frame. In an embodiment the plurality of candidate motion vectors that are tested comprise up to (and including) the eight motion vectors that correspond to the eight data elements (e.g. pixels) that (immediately) surround the data element to which the null motion vector points in the first and/or second frame.

In one embodiment the plurality of candidate motion vectors around the null motion vector are shifted from the null (or other initial) motion vector by a single data element (e.g. pixel) in the second frame. It will be appreciated that when the first frame (which is between the second frame and the extrapolated frame in the sequence of frames) comprises data elements provided at the same resolution as the second frame, these plurality of motion vectors may not point directly to a data element in the first frame, e.g. owing to the relative (temporal) spacings of the first and second frames and the extrapolated frame.

Instead, these plurality of motion vectors may point to respective locations in the first frame that fall between data elements (e.g. at the sub-pixel level). For example, when the extrapolated frame is positioned after the first frame at half the spacing (in time) of the first and second frames, a motion vector from the extrapolated frame that is shifted by a single data element in the second frame is shifted by third of the distance between data elements in the first frame.

In this embodiment (when the plurality of candidate motion vectors around the null motion vector are shifted from the null (or other initial) motion vector by a distance that is less than the spacing between data elements in the first frame), the region in the first frame (for comparing with the region in the second frame) may be formed (e.g. the data values that are to be used for the purpose of comparison with the corresponding data values in the region of the second frame) by interpolating (e.g. linearly) between data elements in the first frame.

The interpolation may (e.g. depending on the direction in which a candidate motion vector has been shifted) be bilinear (e.g. using data elements in both the x and y directions in the first frame. However, in an embodiment, the interpolation is linear (e.g. only in the x direction). This is because object motion is more likely to occur in this direction (e.g. owing to horizontal panning in scenes of video image data).

It will be appreciated that when a plurality of candidate motion vectors are tested around the null (or other initial) motion vector, this results in a larger area (cumulative regions) of the second frame being considered, owing to it being further from the extrapolated frame than the first frame.

Although the null motion vector is a straightforward, default starting point for testing candidate motion vectors, it may be possible to use a more intelligent starting point for testing candidate motion vectors. Therefore, in one embodiment, the one or more candidate motion vectors comprise one or more previously determined motion vectors for the or a previous extrapolated frame.

The Applicant has appreciated that motion vector(s) that have been determined previously, either for other region(s) of the current extrapolated frame being generated or for a previously generated extrapolated frame (e.g. the immediately previous extrapolated frame generated using the second frame and a third, earlier (rendered or decoded) frame), may help to provide a more informed starting point for the determination of the motion vector for the region of the extrapolated frame being processed. This is because the object motion for a region of the extrapolated frame being processed may be similar to the object motion of regions that are spatially and/or temporally close to this region.

Thus, in one embodiment the one or more candidate motion vectors comprise one or more motion vectors determined previously for one or more (other) regions of an or the extrapolated frame.

Any suitable and desired previously determined motion vector(s) may be used from any suitable and desired other region(s) of an or the extrapolated frame. In one embodiment the one or more candidate motion vectors comprise one or more motion vectors determined previously for one or more different respective regions of the same extrapolated frame.

Such "spatial" candidate motion vector(s) may have been determined for regions that are spatially close to the region of the extrapolated frame for which a motion vector is being determined currently and so may help to provide an initial guide as to regions in the first and second frames that should be compared. In an embodiment these "spatial" candidate motion vector(s) have been determined for regions of the same extrapolated frame that are adjacent to (e.g. bordering) the region of the extrapolated frame for which the motion vector is being determined.

In one embodiment the one or more candidate motion vectors comprise one or more motion vectors determined previously for one or more respective regions of a previously generated extrapolated frame. Such "temporal" candidate motion vector(s) may have been determined for regions that are temporally (and, e.g., spatially) close to the region of the extrapolated frame for which a motion vector is being determined currently and so may help to provide an initial guide as to regions in the first and second frames that should be compared.

In an embodiment these "temporal" candidate motion vector(s) have been determined for the same region of the (e.g. immediately) previous extrapolated frame as, or for regions of the (e.g. immediately) previous extrapolated frame that are adjacent to (e.g. bordering) the region of, the (current) extrapolated frame for which the motion vector is being determined.

In an embodiment (when the extrapolated frame has been divided into a plurality of regions for which respective motion vectors are to be determined), the plural regions of the extrapolated frame are processed in raster order (e.g. from top left in rows). Thus, there may be one or more motion vectors determined previously that are available from the current extrapolated frame (i.e. "spatial" candidates) for one or more respective (close, e.g. adjacent) regions that precede the current region in the raster order, e.g. that are above and/or to the left of the region of the extrapolated frame, for which the motion vector is being determined currently.

Similarly, there may be one or more motion vectors determined previously that are available from the previous extrapolated frame (i.e. "temporal" candidates) for one or more respective (close, e.g. adjacent) regions that are after the current region in the raster order, e.g. that are below and/or to the right of the region of the extrapolated frame for which the motion vector is being determined currently, as well as for the same region in the previous extrapolated frame. The "temporal" candidate motion vectors, when available, e.g. for regions above and/or to the left of the region of the extrapolated frame for which the motion vector is being determined currently may also be used (e.g. as well as or instead of) the "spatial" candidate motion vectors for these regions, e.g. when the "spatial" candidate motion vectors are not yet available.

In a similar manner as described above for testing one or more candidate motion vectors by searching around the null motion vector (e.g. performing a "full" search), one or more candidate motion vectors may be tested around (e.g. each of) the one or more previously determined spatial and temporal motion vectors. For example, for each previously determined motion vector that is used for testing as a candidate motion vector for the current region of the extrapolated frame being generated, one or more (e.g. a plurality of) candidate motion vectors around the previously determined motion vector may also be tested.

Instead of performing a "full" search around a candidate motion vector, a cruder "fast" search over a larger area (but, e.g., with fewer regions compared between the first and second frames) could be performed. However, the Applicant has found that performing a full search around each candidate motion vector, that varies the regions in the first and second frames being compared over a more limited range (e.g. by a single data element from the central candidate motion vector), helps to introduce smoothness on the motion vectors determined (e.g. in the "motion vector field") for the regions of the extrapolated frame. This is because the more limited variation in the search area for the regions being compared when performing such a "full search" helps to limit the variation between the motion vectors being determined for respective neighbouring regions of the extrapolated frame.

In one embodiment (e.g. instead of or in addition to using motion vector(s) previously determined for particular region (s) of an extrapolated frame), a candidate motion vector to test for a region of an extrapolated frame may be determined from a plurality (e.g. all) of the motion vectors determined for a (e.g. the immediately) previous extrapolated frame. Such a "global" motion vector may be determined for use as a candidate motion vector once the previous extrapolated frame has been generated, e.g. by averaging the motion vectors determined previously.

The one or more previously determined motion vectors (and, e.g., one or more candidate motion vectors around (e.g. each of) them) may be tested as the one or more candidate motion vectors instead of or, in an embodiment, as well as testing the null motion vector and, e.g., one or more candidate motion vectors around this null motion vector. For example, the null motion vector (and, e.g., one or more candidate motion vectors around this null motion vector) may be tested first and then, when available, one or more previously determined motion vectors (and, e.g., one or more candidate motion vectors around (e.g. each of) them) may be tested.

In addition to or instead of the candidate motion vectors outlined above (e.g. based around the null and/or previously determined motion vectors) that may be tested, in one embodiment the one or more candidate motion vectors comprises a motion vector determined from the motion of a head mounted display (HMD) system (e.g. determined from head orientation (pose) sensor data detected by the HMD system). Again, as with the null and/or previously determined motion vectors, candidate motion vectors around the motion vector determined from the head mounted device may also be tested.

The regions in the first and second frames, as well as the region of the extrapolated frame, may be located relative to the candidate motion vector(s) in any suitable and desired way. For example, the regions in the first and second frames, as well as the region of the extrapolated frame, may be centred on the candidate motion vector(s). In one embodiment a or each candidate motion vector points to the top left hand corner of the regions in the first and second frames being compared, from the top left hand corner of the region of the extrapolated frame.

For a candidate motion vector being tested, the region of the first frame (to which the candidate motion vector points) may be compared with the region of the second frame (to which the candidate motion vector points) in any suitable and desired way to determine whether these regions are similar. In one embodiment the method comprises (and the processing circuit is operable to) calculating a quantitative measure of the similarity between the (e.g. data elements of the) regions of the first and second frames.

Any suitable and desired quantitative measure for comparing such (e.g. data elements of the) regions may be used as the similarity measure that is determined. In one embodiment the method (e.g. the step of comparing the region of the first frame with the region of the second frame and determining a similarity measure) comprises (and the processing circuit is operable to) calculating an error value (e.g. a sum of absolute differences (SAD)) between the (e.g. data elements of the) regions of the first and second frames.

The similarity measure may be determined (e.g. the error value (e.g. sum of absolute differences (SAD)) may be calculated) using any suitable and desired data values associated with the data elements of the regions of the first and second frames being compared. In one embodiment the comparison is performed (e.g. the error value is calculated) using image data associated with (e.g. each of) the data elements (e.g. pixels) of the regions of the first and second frames being compared.

The full image data (e.g. RGB or YCbCr) may be used for the comparison and determining the similarity measure (e.g. when calculating the error value). However, in an embodiment, the luminance (Y) data associated with (e.g. each of) the data elements (e.g. pixels) of the regions of the first and second frames is used when comparing the first and second frames. The Applicant has appreciated that the luminance data (e.g. alone) may be sufficient for comparing the regions of the first and second frames (for motion estimation purposes).

It will be appreciated that the process described, of testing a plurality of candidate motion vectors for the or each of the regions of the extrapolated frame, may result in a large number of candidate motion vectors being tested. This may incur a latency in the process of determining a motion vector for the region of the extrapolated frame (which may be trying to be avoided).

Therefore, in one embodiment, a time limit is imposed on the testing of the one or more candidate motion vectors to help keep the latency of the process to an acceptable level. When the time limit is reached a motion vector may be selected from the candidate motion vectors tested, based on the similarity measures determined for the pairs of regions in the first and second frames that have been compared (e.g. by choosing the most similar match).

In one embodiment, the number of candidate motion vectors to be tested is reduced, in order to reduce the time taken to compare all the pairs of regions in the first and second frames. For example, not all of the one or more candidate motion vectors of the null and previously determined motion vectors may be tested.

When a plurality of candidate motion vectors have been tested (e.g. when the time limit has been reached or all the candidate motion vectors to be tested have been tested), in an embodiment, the candidate motion vector to use for the region of the extrapolated frame may be selected from the plurality of candidate motion vectors based on the similarity measure determined for the pairs of regions in the first and second frames that have been compared (e.g. by choosing the most similar match between the pairs of regions in the first and second frames that have been compared).

Thus, in an embodiment, the method comprises (and the processing circuit is operable to) selecting the motion vector (from the one or more candidate motion vectors tested) having the best similarity measure (e.g. lowest error value) determined from the comparison between the regions of the first and second frames (and then storing an indication representative of this motion vector). This may be found by comparing all of the candidate motion vectors tested (e.g. once a particular time limit has been reached)

While testing the one or more candidate motion vectors (e.g. before a time limit is reached or all the candidate motion vectors to be tested have been tested), in one embodiment the testing (e.g. of a plurality of candidate motion vectors) may be terminated (and thus no further candidate motion vectors are tested for that region of the extrapolated frame) if, when comparing the regions in the first and second frames, the comparison for a particular candidate motion vector results in a similarity (e.g. using a particular threshold of a quantitative measure) being found between the regions in the first and second frames that indicates that the particular candidate motion vector should be used for the region of the extrapolated frame (e.g. that the candidate motion vector is the (e.g. "true") object motion from the second frame through the first frame to the region of the extrapolated frame).

When the testing is terminated in this manner, an indication representative of the particular candidate motion vector tested that satisfies the condition to terminate the testing process is stored as the motion vector for the region of the extrapolated frame.

Thus, in one embodiment the method comprises (and the processing circuit is operable to), when the regions in the first and second frames are determined to be sufficiently similar for a candidate motion vector being tested, using the determined similarity measure, selecting the candidate motion vector to use as the motion vector for generating the extrapolated frame and storing an indication representative of the candidate motion vector (and, e.g., testing no further candidate motion vectors for the region of the extrapolated frame).

The testing of the one or more candidate motion vectors may be terminated when a candidate motion vector identifies sufficiently similar regions in the first and second frames, using the similarity measure. Thus, in an embodiment, the method comprises selecting the motion vector being tested when the similarity measure determined (e.g. the error value calculated) for the comparison between the regions of the first and second frames satisfies (e.g. the error value is less than) a particular threshold (and then storing an indication representative of this motion vector). The particular threshold for the similarity measure (e.g. error value) may be set at any suitable and desired value that indicates that the regions of the first and second frames being compared are considered to represent the (e.g. "true") object motion therebetween.

As the process of the technology described herein aims to identify the actual ("true") object motion between rendered or decoded frames to generate the extrapolated frame, objects that are represented in the rendered or decoded frames, which may be used to identify this object motion when comparing rendered or decoded frames, may not necessarily correspond to (e.g. align with the boundaries of) the regions or tiles into which the rendered or decoded frames, or the extrapolated frame, have been divided.

Therefore, the testing of candidate motion vector(s) for a region of the extrapolated frame may start with a large region of the extrapolated frame (and thus, e.g., a corresponding size of regions in the first and second frames) and then the large region may be divided into a plurality of smaller sub-regions. Candidate motion vector(s) may then be tested for (e.g. each of) these plural, smaller sub-regions, e.g. to determine whether it may be more suitable to use these smaller sub-regions (instead of the larger region) as the basis for determining the motion vectors for the extrapolated frame. Thus, in an embodiment, the method comprises dividing the region into a plurality of sub-regions and testing one or more candidate motion vectors for each of the plurality of sub-regions.

The smaller sub-regions may be sub-divided further and candidate motion vector(s) tested for these. The size of the large(st) region, as well as how many times the region is sub-divided, may, for example, depend on the computational power of the graphics processing system and/or the resolution of the rendered or decoded frames in the sequence being processed.

For example, a region of size 64×64 (or 32×32) data elements (e.g. pixels) may be used in the extrapolated frame as the region for testing the candidate motion vector(s). This larger region may be divided into smaller sub-regions (e.g. 32×32, 16×16, 8×8, 4×4 and/or 2×2, as desired). The corresponding region and sub-regions of the first and second frames (e.g. having the same size as the region or sub-region of the extrapolated frame), pointed to by candidate motion vector(s) for the region and sub-regions of the extrapolated frame, may then be compared to determine the similarity measures for these regions and sub-regions for the purpose of the selecting motion vector(s) to use for the region or sub-regions of the extrapolated frame.

Thus, in an embodiment, the method comprises (and the processing circuit is operable to) selecting one of the candidate motion vectors tested for each sub-region of the extrapolated frame to use as the motion vector for generating the sub-region of the extrapolated frame or selecting one of the candidate motion vectors tested for the region of the extrapolated frame to use as the motion vector when generating the region of the extrapolated frame, based on the determined similarity measures for the tested candidate motion vectors for the region and sub-regions The motion vector(s) to use (for storing the indications) for the region or sub-regions of the extrapolated frame may be determined, e.g. whether to use a single motion vector for the region or plural motion vectors for the respective plurality of sub-regions, in any suitable and desired way. In one embodiment the similarity measure determined (e.g. error value calculated) for the pair of regions (or sub-regions) in the first and second frames may be used to determine which size of region or sub-region is better to use, e.g. which returns the lower (or lowest) error (e.g. SAD) value (e.g. overall).

Thus for example, the similarity measure determined (e.g. error value calculated) for a larger region may be compared with the combined similarity measures (e.g. error values) for a plurality of smaller sub-regions, to determine whether, for a region of the extrapolated frame, to generate the extrapolated frame using a motion vector for the region as a whole or using a plurality of motion vectors associated respectively with the plurality of smaller sub-regions. Indication(s) representative of the motion vector(s) for the region of the extrapolated frame are then stored as appropriate.

The result of this is that plural motion vectors may be determined (and indications representative thereof stored) for the large region, e.g. owing to them being associated with smaller sub-regions and even smaller sub-divided regions.

The candidate motion vectors tested for the (larger) region of the extrapolated frame and for the (smaller) sub-regions may be tested sequentially. For example, the larger region may be divided into the sub-regions after a motion vector has been determined for the larger region.

However, in one embodiment the motion vectors may be determined for the larger region and the smaller sub-regions at the same time. For example, the similarity measure (e.g. error values (e.g. SAD values)) may be determined (calculated) for the larger region at the same time as for the smaller sub-regions. This helps to allow the similarity measures determined for the region and the sub-regions to be compared. When the similarity measures determined for the region and the sub-regions are the same or similar, this may indicate that the same object is represented in both the region and the sub-regions, so there is no need to sub-divide the sub-regions further.

Conversely, when the similarity measures determined are different (e.g. their differences are above a particular threshold), this may indicate that different objects are represented in different sub-regions. It may then be desirable to further sub-divide the sub-regions and test candidate motion vectors for these sub-divided sub-regions (and, in an embodiment, this is what is done).

In one embodiment another or alternative way of determining when a pair of regions of the first and second frames contain multiple objects and/or the boundary of an object, such that it may be more optimal to divide the region of the extrapolated frame being generated to better match it to the objects and/or object boundary, as appropriate, is to calculate the variance of the (e.g. data values associated with the) data elements of the regions (and, e.g., sub-regions) of the first and second frames.

In one embodiment, once the motion vectors have been determined and indications representative of these motion vectors have been stored (e.g. as a motion vector field (MVF)) for (e.g. all of) the regions of the extrapolated frame being generated, some or all of the motion vectors for the extrapolated frame may be compared with each other (e.g. using the representative indications), e.g. to identify when there may be any anomalies in these determined motion vectors.

Thus, in an embodiment, the method comprises (and the processing circuit is operable to), for a (e.g. each) motion vector determined for the extrapolated frame, comparing the motion vector with one or more other motion vectors determined for the extrapolated frame to determine whether the motion vector is consistent with the one or more other motion vectors.

In one embodiment an (e.g. each) motion vector is compared with one or more (e.g. all) of the motion vectors of the regions of the extrapolated frame that are adjacent to (e.g. share a boundary or corner with) the region of the motion vector being compared. Thus a motion vector may be compared with up to eight other motion vectors to determine whether it is consistent with these motion vectors.

The motion vector being compared may be determined to be consistent with the other motion vector(s) in any suitable and desired way. In one embodiment the motion vector is compared with the one or more other motion vectors determined for the extrapolated frame by calculating the difference(s) between the motion vector being compared and (e.g. each of) the one or more other motion vectors. A large difference between motion vectors may indicate that the motion vector being compared is not consistent with its neighbours.

When a motion vector is not consistent with other (e.g. adjacent) motion vectors determine for the extrapolated frame, in an embodiment, the motion vector being compared may be replaced by a corrected motion vector that is derived from the one or more other motion vectors. In one embodiment the corrected motion vector comprises the median motion vector of the one or more other motion vectors. In an embodiment, such a median (e.g. vector) operation should take into account the differences between the other motion vectors in order to provide a corrected motion vector that exists in the set of possible motion vectors.

The comparison between motion vectors and the corrections may comprise using a vector median filter (VMF).

In order to avoid correcting motion vectors that appear to be inconsistent with the other motion vectors in the extrapolated frame but are actually correct (e.g. owing to an actual large variation in the motion vectors or to one or more of the other motion vectors having been determined incorrectly), in an embodiment, the similarity measures determined (e.g. error value calculated) when determining the motion vector being compared (and being considered for correction) and/or the similarity measures determined (e.g. error value calculated) when determining the one or more other motion vectors, are used to determine whether to correct the motion vector. For example, a threshold applied to the similarity measures determined (e.g. error value calculated) may be used to determine whether or not to correct a motion vector when it appears to be inconsistent.

In an embodiment, when the similarity measures determined (e.g. error value calculated) indicates a good match between the regions of the first and second frames (e.g. the SAD value is low), this may indicate that the motion vector determined is likely to be correct and thus should not be corrected (and/or can be relied upon to correct other motion vectors in the extrapolated frame). When the similarity measures determined (e.g. error value calculated) indicates a poorer match between the regions of the first and second frames (e.g. the SAD value is higher), for example, this may indicate that the motion vector determined is less likely to be correct and thus may be suitable for being corrected (and/or is less suitable to be relied upon to correct other motion vectors in the extrapolated frame).

In one embodiment the similarity measures determined (e.g. error value calculated) associated with the one or more other motion vectors may be used to weight these motion vectors (e.g. by calculating a "reliability index" that is inversely proportional to the SAD value calculated when determining the motion vector) when correcting the motion vector (e.g. when calculating the median motion vector of the other motion vectors).

In one embodiment, when the similarity measures determined (e.g. error value calculated) indicates that a motion vector which has been determined is unreliable (e.g. when the SAD value is high (e.g. higher than a threshold)), the motion vector determined may be replaced by the corresponding motion vector determined for the previous extrapolated frame (e.g. instead of correcting it as outlined above).

The motion estimation process may be performed on any suitable and desired component part (i.e. processing circuit(s)) of the graphics processing system. In one embodiment, one or more steps of the process are performed on a graphics processing unit or on a dedicated hardware accelerator (e.g. as part of a display processing unit). Using such processing circuit(s), the step(s) for plural regions, sub-regions and/or candidate motion vectors may be performed in parallel.

The generated extrapolated frames (comprising the stored indications representative of the motion vectors) may be used in any suitable and desired way, e.g. when displaying the sequence of frames (comprising both the rendered or decoded frames and the inserted extrapolated frames). In an embodiment the method comprises (and the graphics processing system comprises a processing circuit operable to) constructing an extrapolated frame using the stored indication(s) representative of the motion vector(s) for the extrapolated frame. This process of constructing the extrapolated frame is known as "motion compensation".

In an embodiment the extrapolated frame is constructed using the stored indication(s) representative of the motion vector(s) for the extrapolated frame and the data elements (e.g. pixel image data) of the first and/or second frame. The data elements may be taken from the first and/or second frame as is suitable and desired.

In one embodiment (e.g. one or more regions of) the extrapolated frame is constructed using (e.g. only) the data elements from the first frame (i.e. the rendered or decoded frame closest to the extrapolated frame). However, to avoid artefacts the data elements from the second frame may also or instead be used.

The data from the second frame may be used when, for example, the similarity measures determined (e.g. error value calculated) for the comparison between the pair(s) of region(s) of the first and second frames are high (e.g. greater than a particular threshold), as this may indicate that the match between the data elements in the regions of the first and second frames is not that reliable. In one embodiment the data elements from the regions of the first and second frames may be weighted, e.g. dependent upon the similarity measure(s) determined (e.g. error value(s) calculated).

In order to indicate how the motion compensation process should be performed, e.g. for a particular (region of an) extrapolated frame, an indication (e.g. tag) as to how to perform the motion compensation for an extrapolated frame may be stored (e.g. along with the indications representative of the determined motion vector(s) for the extrapolated frame). This may, for example, indicate whether to use the data elements from the first and/or second frames, when constructing the extrapolated frame. It may also indicate whether these data elements should be weighted.

In an embodiment, the reconstruction of the extrapolated frame uses the full image data (e.g. all of the pixel components) of the data elements of the first and/or second frames being used. This may be the case even when the motion estimation process may have been performed only using the luminance component of the image data in the first and second frames.

When the extrapolated frame(s) comprise layer(s) that are generated and constructed, e.g. from input layers in a sequence of input layers, in an embodiment the constructed extrapolated layer(s) are then combined with the (and, e.g., other) input layers to construct frames for output and, e.g. display.

The motion compensation process of constructing the extrapolated frame(s) may be performed on any suitable and desired component part (i.e. processing circuit(s)) of the graphics processing system. In one embodiment, one or more steps of the process are performed on a display processing unit, e.g. separately from the motion estimation process when this is performed on a graphics processing unit. However, in an embodiment, the motion compensation process is performed (e.g. together with the motion estimation process) on a graphics processing unit. In another embodiment, both the motion estimation and the motion compensation processes are performed on a display processing unit.

Although the technology described herein has been described above with particular reference to generating a single extrapolated frame, it will be appreciated that plural extrapolated frames may be generated (and displayed on a display). For example, plural extrapolated frames (e.g. two, three, four, eight, etc. extrapolated frames) may be generated from a (and each) pair of first and second frames, e.g. (and in an embodiment) during the time period that a next frame is being rendered or decoded (e.g. by the graphics processing unit (GPU)).

Similarly, when the graphics processing system comprises a head mounted display there may be an extrapolated frame generated for each eye, and a respective extrapolated frame may be displayed to each eye appropriately so as to provide a three-dimensional effect when the images are viewed.

Correspondingly, the technology described herein is in an embodiment applied to a plurality of (rendered or decoded) frames, and in an embodiment to a plurality of (rendered or decoded) frames that are being generated as a sequence of frames for display.

Thus, particularly in the case where the first frame is part of a sequence of frames, in an embodiment the process of the technology described herein of generating extrapolated frames is performed for plural frames of a sequence of frames, and, in an embodiment, for each frame of a sequence of frames. In this case, each rendered or decoded frame may, for example, be compared to its immediately preceding rendered or decoded frame in the sequence.

Other arrangements would, of course, be possible.

The technology described herein is in an embodiment implemented in and as part of an overall graphics processing system that includes one or more of: a host processor (central processing unit (CPU)), a graphics processing unit, a display controller, a video processor (codec), a system bus, and a memory controller.

The processing circuit(s) of the technology described herein may, e.g., form part of the graphics processing unit, the display controller and/or another suitable component of the graphics processing system, e.g. as described above, or may otherwise be provided in the graphics processing system. It may comprise programmable and/or fixed function processing circuit(s), and/or may comprise dedicated processing circuit(s) and/or processing circuit(s) used for other processing as well, as desired.

The host processor may execute applications that can require graphics processing by the graphics processing unit, and send appropriate commands and data to the graphics processing unit to control it to perform graphics processing operations and to produce graphics processing (render) output required by applications executing on the host processor (including in the manner of the technology described herein).

To facilitate this, the host processor should, and in an embodiment does, also execute a driver for the graphics processing unit and a compiler or compilers for compiling shader programs to be executed by programmable shading stages of the graphics processing unit (which compiler may be, and in an embodiment is, a part of the driver).

Thus, in an embodiment, the graphics processing unit is in communication with a host microprocessor (that is part of the overall graphics processing system) that executes a driver for the graphics processing unit and/or a compiler or compilers for the graphics processing unit.

Similarly, there is, in an embodiment, an application on the host processor that indicates a requirement for performing processing operations in the manner of the technology described herein, which requirement is then recognised by, e.g., the driver executing on, the host processor, with the, e.g. driver on, the host processor then operating to instruct the graphics processing unit to render data accordingly.

The graphics processing unit and/or host microprocessor are, in an embodiment, also in communication with a (head mounted) display for displaying the images generated by the graphics processing unit (thus, in an embodiment, the graphics processing system further comprises a display for displaying the images generated by the graphics processing unit) (e.g. via the display controller).

Similarly, in an embodiment, the graphics processing system has or is in communication with a memory in which frames (images) generated by the graphics processing unit may be stored, e.g. for subsequent processing, e.g. display (e.g. via the memory controller). Thus, in an embodiment, the graphics processing system and/or unit comprises, and/or is in communication with, one or more memories and/or memory devices that store the data described herein, and/or that store software for performing the processes described herein.

The graphics processing unit can include, and in an embodiment does include, any one or more, and in an embodiment all, of the processing stages that a graphics processing unit can normally include. Thus, for example, in an embodiment the graphics processing unit includes a primitive setup stage, a rasteriser and a renderer. In an embodiment the renderer is in the form of or includes a programmable fragment shader.

The graphics processing unit is, in an embodiment, a tile-based graphics processing unit comprising a tile buffer for storing tile sample values and/or a write out unit that operates to write the data in the tile buffer (e.g. once the data in the tile buffer is complete) out to external (main) memory (e.g. to a frame buffer).

It will be appreciated by those skilled in the art that all of the described embodiments of the technology described herein can, and in an embodiment do, include, as appropriate, any one or more or all of the features described herein.

The technology described herein can be implemented in any suitable system, such as a suitably configured microprocessor based system. In an embodiment, the technology described herein is implemented in a computer and/or micro-processor based system.

The technology described herein is, in an embodiment, implemented in a portable device, such as a mobile phone or tablet. The technology described herein is, in an embodiment, implemented in a virtual reality and/or augmented reality display device, such as a virtual reality and/or augmented reality headset. Thus, another embodiment of the technology described herein comprises a virtual reality and/or augmented reality display device comprising the graphics processing system of any one or more of the embodiments of the technology described herein.

Correspondingly, another embodiment of the technology described herein comprises a method of operating a virtual reality and/or augmented reality display device, comprising operating the virtual reality and/or augmented reality display device in the manner of any one or more of the embodiments of the technology described herein.

The various functions of the technology described herein can be carried out in any desired and suitable manner. For example, the functions of the technology described herein can be implemented in hardware or software, as desired. Thus, for example, unless otherwise indicated, the various functional elements, stages and "means" of the technology described herein may comprise a suitable processor or processors, controller or controllers, functional units, circuits, processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuit(s), e.g., in the form of one or more fixed-function units (hardware) (processing circuit(s)), and/or in the form of programmable processing circuit(s) that can be programmed to perform the desired operation. Equally, any one or more of the processing stages and processing stage circuit(s) of the technology described herein may be provided as a separate circuit element to any one or more of the other processing stages or processing stage circuit(s), and/or any one or more or all of the processing stages and processing stage circuit(s) may be at least partially formed of shared processing circuit(s).

Subject to any hardware necessary to carry out the specific functions discussed above, the components of the graphics processing system can otherwise include any one or more or all of the usual functional units, etc., that such components include.

The methods in accordance with the technology described herein may be implemented at least partially using software, e.g. computer programs. It will thus be seen that in further embodiments the technology described herein comprises computer software specifically adapted to carry out the methods described herein when installed on a data processor, a computer program element comprising computer software code portions for performing the methods described herein when the program element is run on a data processor, and a computer program comprising code adapted to perform all the steps of a method or of the methods described herein when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD-ROM, RAM, flash memory, or disk.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over a tangible medium, including but not limited to optical or analogue communications lines. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic or optical. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of embodiments of the technology described herein will now be described.

The drawings relate to the process of displaying frames to a user in a virtual reality or augmented reality display system, and in particular in a head-mounted virtual reality or augmented reality display system, that are relevant to embodiments of the technology described herein. As will be appreciated by those skilled in the art there may be other elements of the system that are not illustrated in the drawings. It should also be noted here that the drawings are only schematic, and that, for example, in practice the shown elements may share significant hardware circuits, even though they are shown schematically as separate elements in the drawings.

Like reference numerals are used for like components where appropriate in the drawings.

Figure 3:
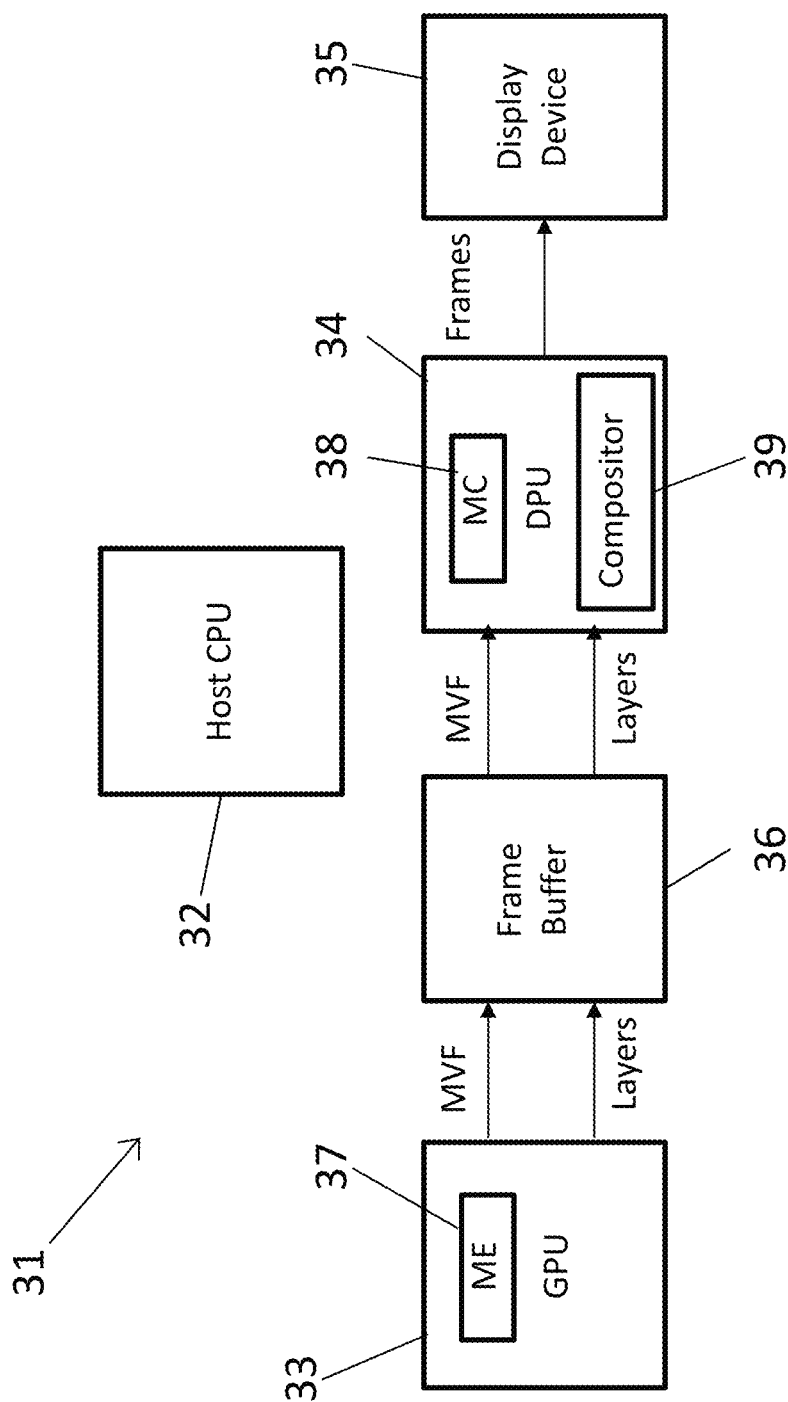
FIG. 3 shows a graphics processing system according to an embodiment of the technology described herein.

An exemplary system on chip (SoC) graphics processing system on which embodiments of the technology described herein may be implemented is shown in FIG. 1, as described above. FIG. 3 shows schematically an embodiment of such a graphics processing system.

The graphics processing system 31 shown in FIG. 3, in a similar manner to the graphics processing system shown in FIG. 1, includes a host processor comprising a central processing unit (CPU) 32, a graphics processing unit (GPU) 33, a display processing unit (DPU) 34 and a display device 35 (as shown in FIG. 1, these components may communicate via an interconnect). These units communicate with and have access to a frame buffer 36, e.g. in the main (off-chip) memory. The graphics processing unit (GPU) 33 will render frames (images) to be displayed (or layers of frames to be composited into frames), and the display processing unit (DPU) 34 will then provide the frames (e.g. composited from the layers) to the display device 35 for display.

The graphics processing unit (GPU) 33 includes a motion estimation (ME) unit 37 that is operable to perform motion estimation between frames (or layers) of image data that the GPU 33 renders. In use of the graphics processing system 31, an application such as a game, executing on the host processor (CPU) 32 will, for example, require the display of frames on the display 35. To do this, the application will submit appropriate commands and data to a driver for the graphics processing unit (GPU) 33 that is executing on the CPU 32. The driver will then generate appropriate commands and data to cause the graphics processing unit (GPU) 32 to render appropriate (e.g. layers of) frames for display.

The graphics processing unit (GPU) 32 will be configured to render (e.g. layers of) frames, at an appropriate rate, such as 30 frames per second, e.g. based on its processing, power, memory and cooling capabilities. However, in order to mitigate motion sickness that may be caused by motion judder from displaying frames at this rate, the graphics processing unit (GPU) 32 is operable to construct and encode intermediate (e.g. layers of) frames between each of the rendered (e.g. layers of) frames.

This is done by the motion estimation (ME) unit 37 performing motion estimation using the rendered (e.g. layers of) frames to predict the position of objects in the intermediate (e.g. layers of) frames, based on the local motion of these objects between the rendered (e.g. layers of) frames. The motion vectors generated by this process are used to provide an encoded version of the intermediate (e.g. layers of) frames, such that the full image data for the intermediate (e.g. layers of) frames does not have to be rendered and stored. The rendered (e.g. layers of) frames and the motion vectors (in the form of a motion vector field (MVF) for each intermediate (e.g. layer of) frame) are stored in appropriate frame buffers 36, e.g. in the main memory.

The display processing unit (DPU) 34 includes a motion compensation (MC) unit 38. The motion compensation (MC) unit 38 is operable to perform motion compensation in order to construct the intermediate frames (or layers) for display. The motion compensation process uses the frames (or layers) of image data that the GPU 33 renders and the motion vector field (MVF) determined by the motion estimation (ME) unit 37 of the GPU 33. This allows the display device 35 to display frames at a higher (e.g. double the) rate than that at which the frames (or layers) were generated by the GPU 33.

The display processing unit (DPU) 34 also includes a compositor 39 that is operable to composite the layers of frames into the final frames for display. The display processing unit (DPU) 34 reads the frames (or layers) of image data that the GPU 33 renders and the motion vector field (MVF) from the frame buffer 36. Motion compensation is performed and then the compositing of layers generated by the motion compensation process, if necessary.

Once the motion compensation and the compositing of the final frames to be displayed have been performed by the motion compensation (MC) unit 38 and the compositor 39 respectively, the frames are displayed on the display panel of the display device 35.

Figure 4:
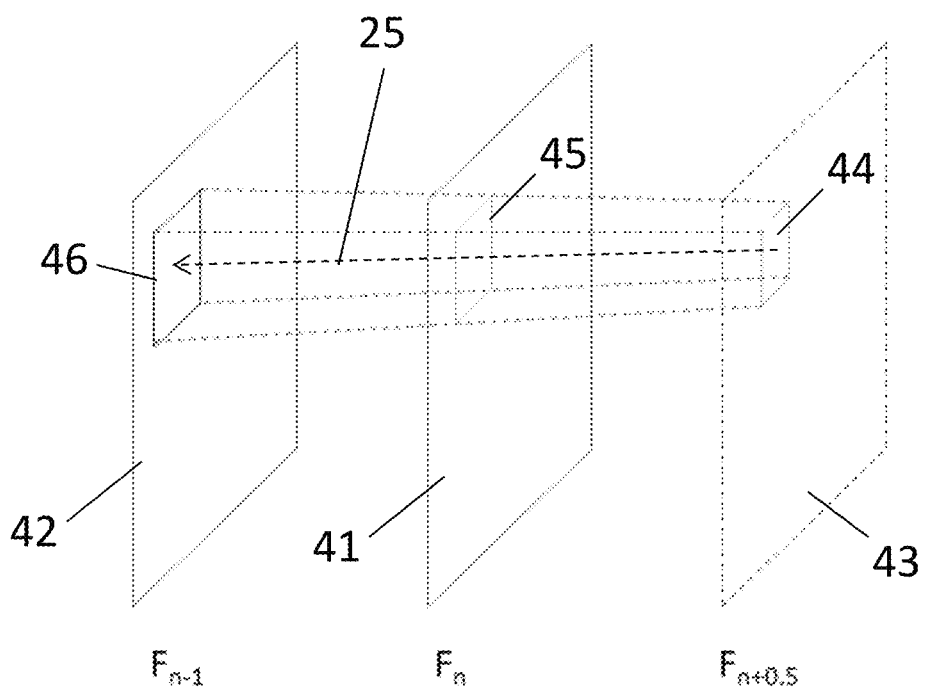
FIG. 4 shows a method of generating an extrapolated frame according to an embodiment of the technology described herein.

An overview of the operation of an embodiment of the technology described herein will now be described with reference to FIG. 4. FIG. 4 shows schematically a motion estimation process in accordance with an embodiment of the technology described herein. This motion estimation process may be performed on the GPU 33 by the motion estimation (ME) unit 37.

Shown in FIG. 4 are two frames of image data that have been rendered by a graphics processing system, e.g. by the graphics processing system 31 shown in FIG. 3. A current frame $F_n$ 41 and a previous frame $F_{n-1}$ 42, rendered by a graphics processing system, are used to construct an extrapolated frame $F_{n+0.5}$ 43. This is done by performing motion estimation between the current frame $F_n$ 41 and the previous frame $F_{n-1}$ 42 from the perspective of the extrapolated frame $F_{n+0.5}$ 43. This then allows the extrapolated frame $F_{n+0.5}$ 43 to be constructed from the motion vectors determined from the motion estimation process.

(It will be appreciated that the extrapolated frame is constructed, for the purpose of displaying the frame, to appear half way between the current rendered frame $F_n$ 41 and the subsequent rendered frame $F_{n+1}$ in the sequence of frames. However, for the purpose of clarity, the frames are shown schematically in FIG. 4 with the extrapolated frame $F_{n+0.5}$ 43 spaced from the current frame $F_n$ 41 by the same distance the current frame $F_n$ 41 is spaced from the previous frame $F_{n-1}$ 42. Similarly, a previous extrapolated frame $F_{n-0.5}$, which is not shown for the purpose of clarity, will also be generated and inserted into the sequence of frames between the previous rendered frame $F_{n-1}$ 42 and the current rendered frame $F_n$ 41.)

As shown in FIG. 4, for a block 44 of the extrapolated frame $F_{n+0.5}$ 43 to be constructed, a region 45 of the current frame $F_n$ 41 and a corresponding region 46 of the previous frame $F_{n-1}$ 42, projecting backwards from the extrapolated frame $F_{n+0.5}$ 43, are searched in order to determine a motion vector projected from the block 44 of the extrapolated frame 43 that joins an object displayed in the current frame $F_n$ 41 and the corresponding display of the object in the previous frame $F_{n-1}$ 42.

This may be done by taking a candidate motion vector 25 from the block 44 in the extrapolated frame $F_{n+0.5}$ 43 which projects through (and thus intersects) the current frame $F_n$ 41 and the previous frame $F_{n-1}$ 42. The blocks of image data in the current frame $F_n$ 41 and the previous frame $F_{n-1}$ 42 that this candidate motion vector 25 intersects are compared, e.g. by calculating an (e.g. SAD) error between the two blocks.

Plural such blocks within the regions 45, 46 of the current frame $F_n$ 41 and the previous frame $F_{n-1}$ 42 (e.g. corresponding to plural different candidates for the motion vector 25) may be compared in order to search for the actual motion of object(s) in the previous frame $F_{n-1}$ 42 to the current frame $F_n$ 41. This then allows it to be determined what object, that is displayed in the current frame $F_n$ 41 and the previous frame $F_{n-1}$ 42, should be displayed at the location of that block 44 in the extrapolated frame $F_{n+0.5}$ 43.

This motion estimation process is repeated for all blocks of the extrapolated frame $F_{n+0.5}$ 43. The set of motion vectors (i.e. the motion vector field) for the blocks of the extrapolated frame $F_{n+0.5}$ 43 then defines how the extrapolated frame $F_{n+0.5}$ 43 should be constructed based on the image data from the previously rendered current frame $F_n$ 41 and previous frame $F_{n-1}$ 42. This motion vector field is then used in the motion compensation process, along with the rendered image data from the current frame $F_n$ 41 and previous frame $F_{n-1}$ 42, to construct the extrapolated frame $F_{n+0.5}$ 43 for display, i.e. in between the current rendered frame $F_n$ 41 and the subsequent rendered frame $F_{n+1}$.

A more detailed explanation of how the motion estimation and subsequent motion compensation is performed in one embodiment of the technology described herein will now be described with reference to FIGS. 5-12, in particular with reference to FIGS. 5a, 5b and 5c.

Figure 5A:
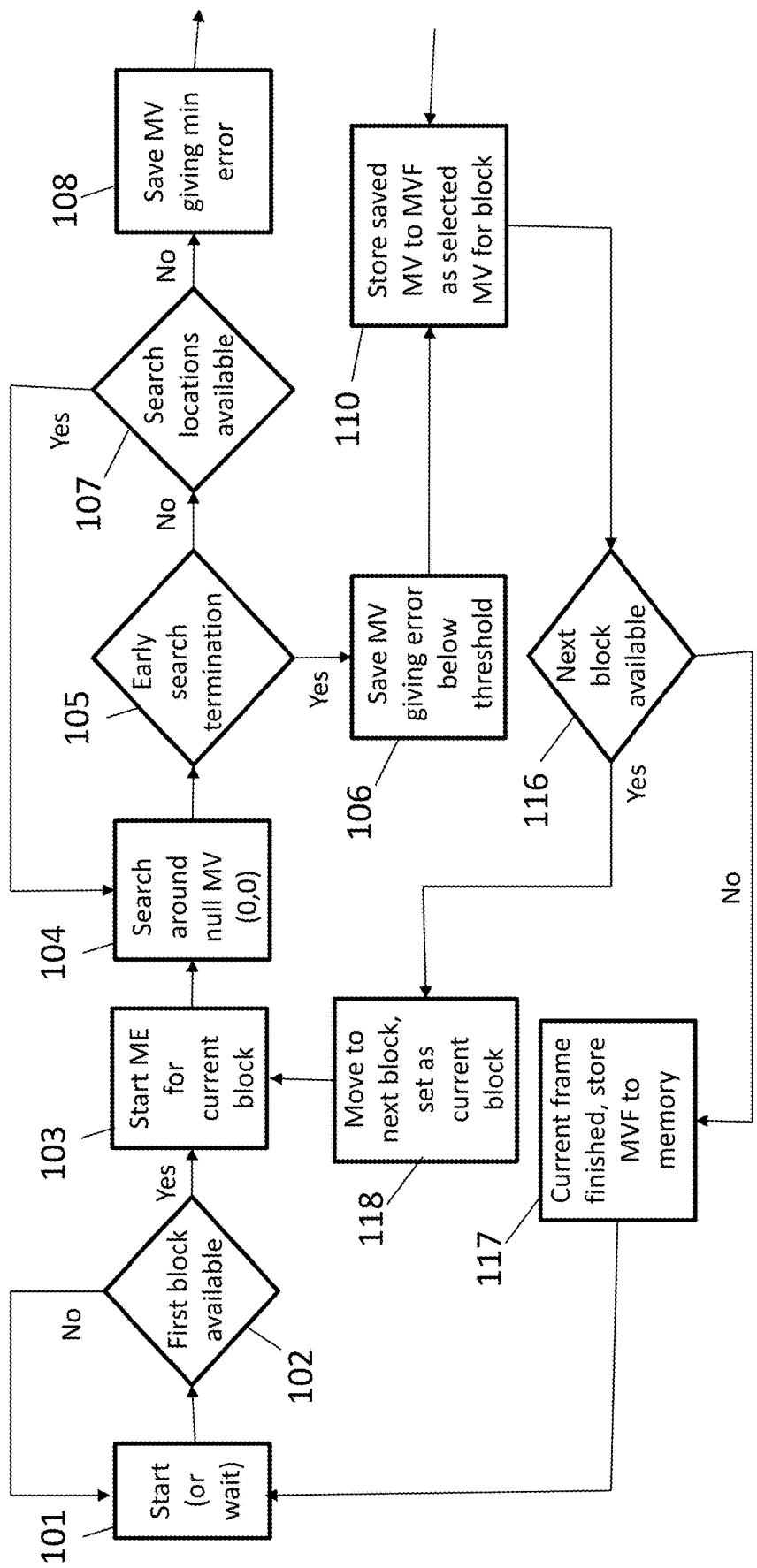
FIGS. 5a, 5b and 5c is a flowchart showing schematically the operation of a graphics processing system according to an embodiment of the technology described herein.
Figure 5B:
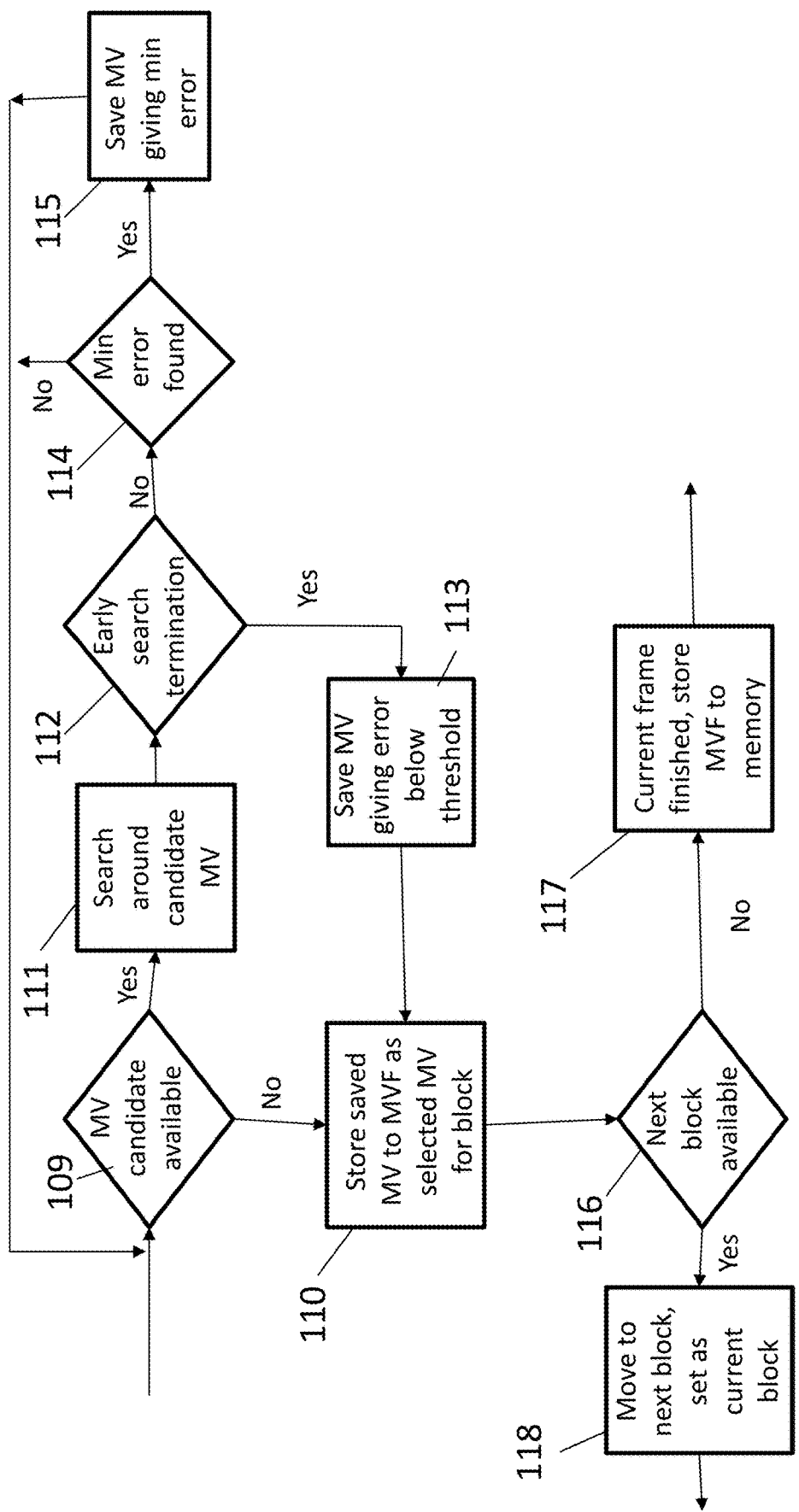
Figure 5C:
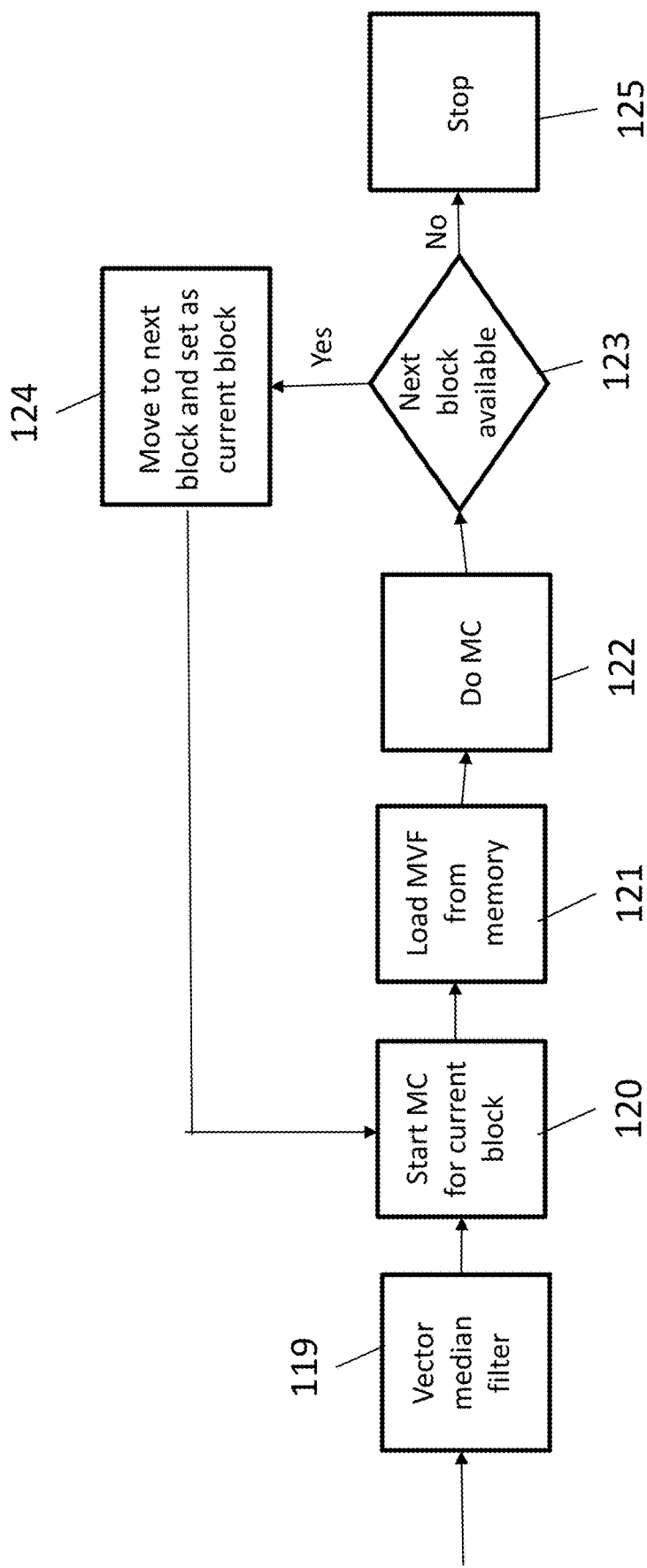

FIGS. 5a, 5b and 5c show a flow chart of the operation of the motion estimation and motion compensation processes according to an embodiment of the technology described herein. In this embodiment, the motion estimation (ME) unit 37 of the GPU 33 performs the motion estimation process and the motion compensation (MC) unit 38 of the DPU 34 performs the motion compensation process, as shown in FIG. 3.

FIG. 5a shows a process of motion estimation being performed by searching in the locations around the corresponding block of the previous rendered frame $F_{n-1}$ 42 (i.e. the null motion vector (0,0)). To start the process (step 101, FIG. 5a), the GPU 33 checks to see when a block from the current frame $F_n$ 41 being rendered is available in the frame buffer 36. When the first block is available (step 102, FIG. 5a), the ME unit 37 is able to start the motion estimation process for this block (step 103, FIG. 5a). When the first block is not available, the GPU 33 waits (e.g. for a set period of time), before checking again to see when the first block is available (steps 102 and 103, FIG. 5a).

Once the first block of the current frame $F_n$ 41 is available, the motion estimation process starts by searching around the null motion vector (i.e. the corresponding location to the block in the extrapolated frame $F_{n+0.5}$ 43) in the current and previous rendered frames $F_n$ 41, $F_{n-1}$ 42 (step 104, FIG. 5a) for objects that correspond to each other in the current and previous frames $F_n$ 41, $F_{n-1}$ 42. The regions 45, 46 to be searched in the current and previous frames $F_n$ 41, $F_{n-1}$ 42 correspond to each other owing to their projection from the block 44 in the extrapolated frame $F_{n+0.5}$ 43 for which the motion estimation is being performed, as shown in FIG. 4.

For example, for the block 44 in the extrapolated frame $F_{n+0.5}$ 43, the search may be performed at the corresponding regions 45, 46 (e.g. blocks of pixels) and the eight surrounding regions in the current and previous frames $F_n$ 41, $F_{n-1}$ 42 (e.g. blocks of pixels translated by a pixel in each direction in the current frame 41 and by a respective three pixels in each direction in the previous frame 42).

For each of these candidate regions 45, 46 in the current and previous frames $F_n$ 41, $F_{n-1}$ 42, an error metric using the sum of absolute differences (SAD) between the image data in the current and previous frames $F_n$ 41, $F_{n-1}$ 42 for the motion vector being assessed is calculated. This compares each pair of candidate regions 45, 46 (for a respective motion vector) to determine when the candidate regions 45, 46 are similar such that the respective motion vector represents the actual object motion between the current and previous frames $F_n$ 41, $F_{n-1}$ 42 towards the block 44 in the extrapolated frame $F_{n+0.5}$ 43.

If, as part of this searching, a motion vector between the current and previous frames $F_n$ 41, $F_{n-1}$ 42 from the extrapolated frame $F_{n+0.5}$ 43 results in the error metric (SAD value) having a value below a particular threshold, the search is terminated (step 105, FIG. 5a), e.g. before all of the locations around the null motion vector have been tested. When the search is terminated in this way, the motion vector resulting in this error below the threshold is saved (step 106, FIG. 5a).

As this is process of early termination is assumed to have found the "true" (actual) motion vector for the block, the motion vector is stored to the motion vector field in the frame buffer 36 (step 110. FIG. 5a). The motion estimation process can then move to the next available block (steps 116, 118, 103, FIG. 5a). When all the blocks have been processed, such that motion vectors have been assigned to all the blocks of the extrapolated frame, the motion vector field is stored in the frame buffer 36 in the memory (step 117, FIG. 5a). The whole process is then repeated to generate the next extrapolated frame in the sequence.

When the search is not terminated early, this motion estimation process is repeated for each of the available and desired search locations around the null motion vector (e.g. that possess image data in the current and previous frames $F_n$ 41, $F_{n-1}$ 42 for comparison with each other) that have yet to be tested (step 107, FIG. 5a). Once all the locations that are to be included in the search have been tested (and the search has not been terminated early), the motion vector returning the lowest SAD error between the image data in the current and previous frames $F_n$ 41, $F_{n-1}$ 42 is saved (step 108, FIG. 5a).

It will be appreciated that the default option of searching around the null motion vector (i.e. the same location as the block in the extrapolated frame $F_{n+0.5}$ 43 for which the motion vector is being determined) may not necessarily be the most informed search to perform to match objects in the current and previous frames $F_n$ 41, $F_{n-1}$ 42, in order to determine the motion vectors for blocks in the extrapolated frame $F_{n+0.5}$ 43. In particular, when motion vectors have already been determined for other (e.g. nearby) blocks in the extrapolated frame $F_{n+0.5}$ 43 or for previous extrapolated frames, these motion vectors may be used to help predict where to search in the current and previous frames $F_n$ 41, $F_{n-1}$ 42 in order to calculate the motion vectors for the block being processed in the extrapolated frame $F_{n+0.5}$ 43.

Figure 6:
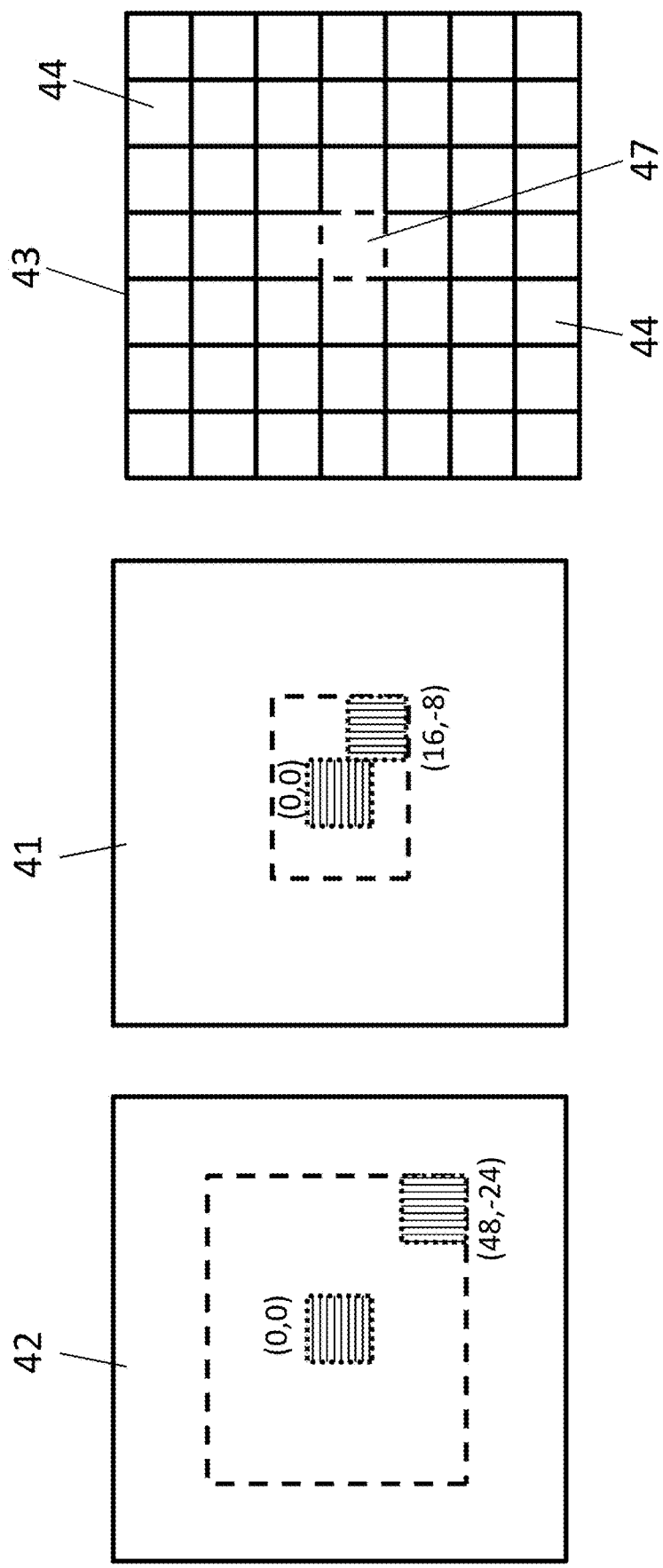
FIG. 6 shows regions in rendered frames being compared to generate an extrapolated frame according to an embodiment of the technology described herein.

This process of using previously determined motion vectors in the motion estimation process will now be described with reference to FIGS. 6-9. FIG. 6 shows schematically a current frame 41, a previous frame 42 and an extrapolated intermediate frame 43 that is to be constructed (e.g. corresponding to the frames shown in FIG. 4).

As shown in FIG. 6, the extrapolated frame 43 is divided into blocks 44 for the purpose of determining the motion vectors. It should be noted that these blocks are not necessarily provided to scale, they are just provided for the purpose of illustration. The (dashed) block 47 at the centre of the extrapolated frame 43 is the block for which motion estimation is currently being performed and illustrated. The process will be repeated for each of the other blocks of the extrapolated frame 43 in a similar manner.

As described above with reference to FIG. 5a, first a search is performed around the null motion vector of the corresponding blocks in the current and previous frames 41, 42. However, based on previously determined motion vectors, further searches may also be performed around these motion vectors. FIG. 6 shows one example of such a search being performed using a previously determined motion vector.

The motion vector is followed from the block 47 at the centre of the extrapolated frame 43 (i.e. located at coordinates (0,0)) to the current frame 41, to the block at coordinates (16,−8) in the current frame 41. This motion vector also points to the block at coordinates (48,−24) in the previous frame 42 (owing to the relative temporal spacings of the current, previous and extrapolated frames 41, 42, 43). Searches in the current and previous frames 41, 42 are performed (e.g. in the same manner as the searches around the null motion vector) to determine the motion vector for the block 47 at the centre of the extrapolated frame 43.

Owing to the projection of the motion vector from the central block 47 in the extrapolated frame 43 through to the previous frame 42, it can be seen that the potential area over which searches may be performed in the previous frame 42 is larger than the corresponding area in the current frame 41.

Figure 7:
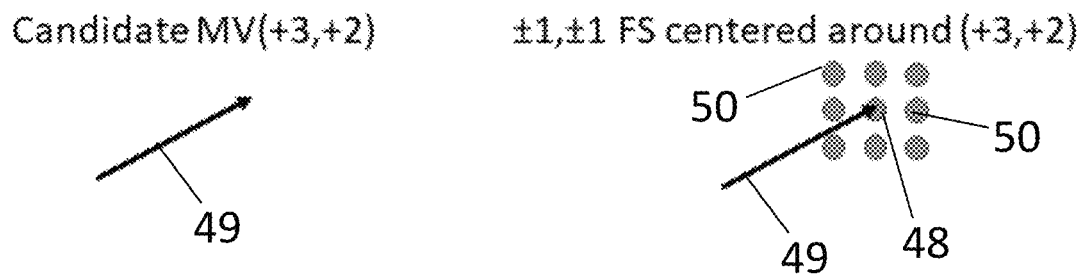
FIG. 7 shows candidate motion vectors being used to point to regions in rendered frames that are to be compared according to an embodiment of the technology described herein.

When a search is performed (e.g. any of the searches outlined above), any type of search may be performed. However, typically a "full search", as shown in FIG. 7 is performed. FIG. 7 shows schematically how a full search is performed.

For a location in the frame being searched (e.g. a block of pixels based on the pixel 48 at the location), which is pointed to by a (e.g. previously determined) motion vector 49, the full search may be performed at this location (e.g. block of pixels) and at the eight surrounding locations 50 (e.g. blocks of pixels translated by a pixel in each direction in the current frame 41 and by a respective three pixels in each direction in the previous frame 42).

Figure 8:
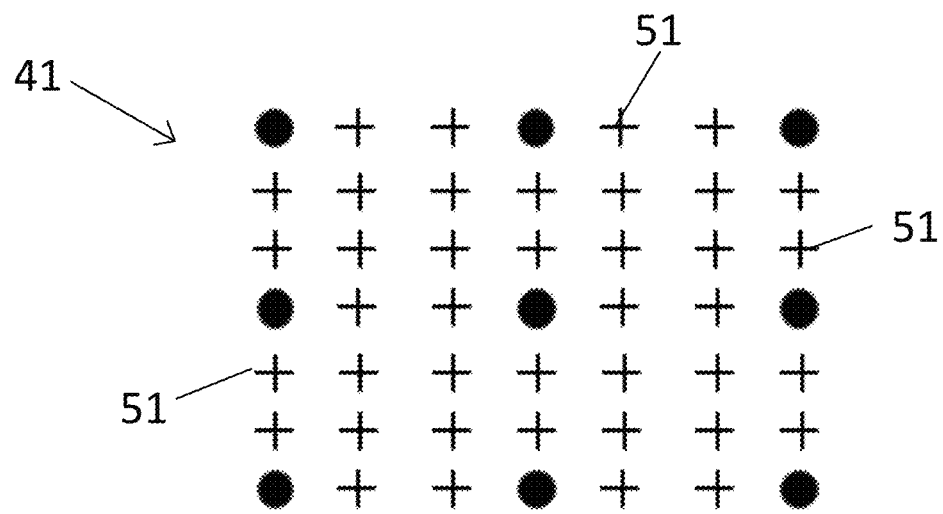
FIG. 8 shows sub-pixel locations that may be interpolated between data elements of a region of a rendered frame.

Furthermore, using motion vectors from the extrapolated frame 43 through the current frame 41 to the previous frame 42, instead of translating the search at the pixel level in the current frame 41, it will be appreciated that when the locations being searched in the previous frame 42 are translated by adjacent single pixels 50, this corresponds to a translation at the sub-pixel (sub-pel) level of the search locations in the current frame 41. FIG. 8 shows sub-pel search locations in the current frame 41.

As shown in FIG. 8, when the locations being searched in the previous frame 42 are translated by adjacent pixels 50, this corresponds to locations being translated by a third of a pixel 51 in the current frame 41. This is owing to the relative (temporal) spacing of the current and previous frames 41, 42 compared to the extrapolated and current frames 43, 41, the spacing of the latter pair of frames being half that of the former pair of frames.

Testing the sub-pel locations (e.g. blocks based on the sub-pixels 51) in the current frame 41 against the pixel-level locations (e.g. blocks based on the pixels 50) in the previous frame 42 may be performed by performing linear interpolation of the image data corresponding to the pixels in a single (x or y) dimension, or by performing bilinear interpolation of the image data corresponding to the pixels in two dimensions. The interpolated image data at the sub-pel level from the current frame 41 can then be compared with the pixel-level image data from the previous frame 42.

Figure 9:
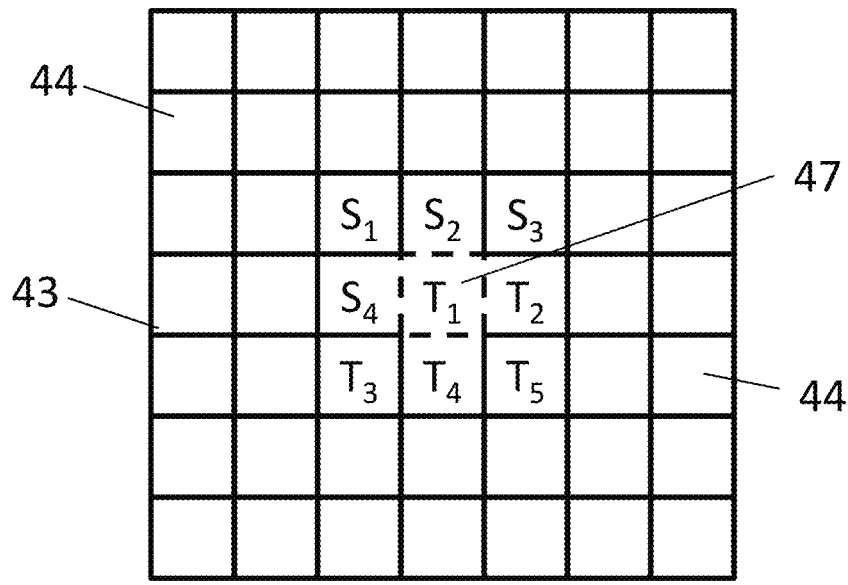
FIG. 9 shows previously determined motion vectors being used to compare regions in rendered frames according to an embodiment of the technology described herein.
Figure 9:
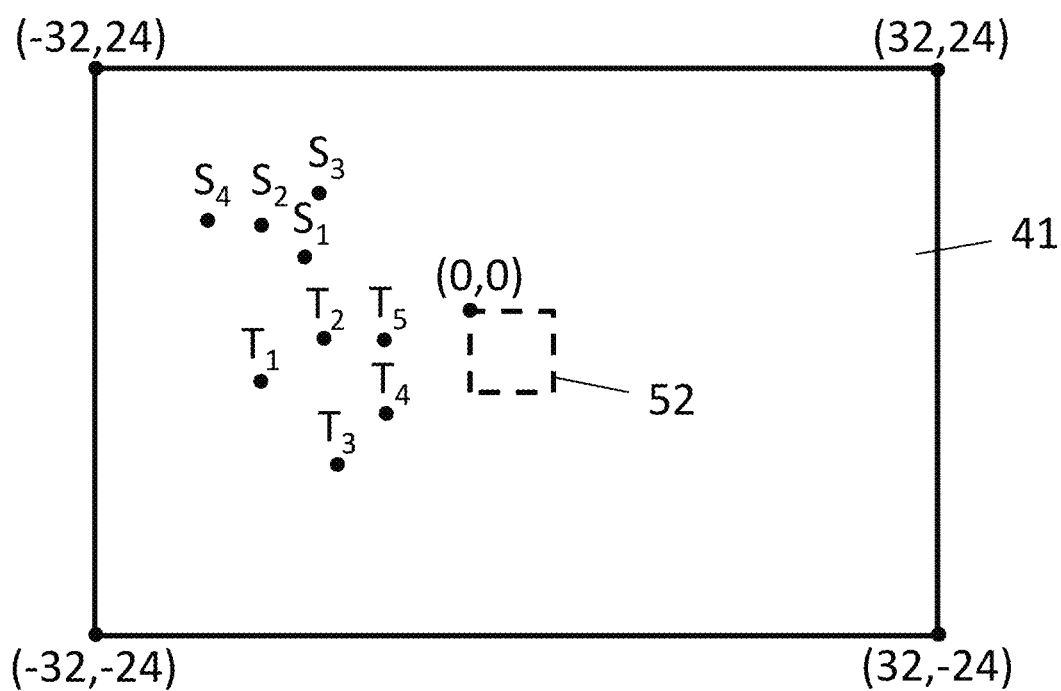

The searches performed using previously determined motion vectors may be repeated for a number of previously determined motion vectors, as will now be described with reference to FIG. 9. FIG. 9 shows schematically a plurality of previously determined motion vectors from blocks in an extrapolated frame being used for the basis of searches in the current and previous frames to determine the motion vector to use for a block in the extrapolated frame.

In the same manner as is shown in FIG. 6, the extrapolated frame 43 is divided into blocks 44 for the purpose of determining the motion vectors. The (dashed) block 47 at the centre of the extrapolated frame 43 is the block for which motion estimation is currently being performed and illustrated. The process will be repeated on each of the other blocks in a similar manner.

In the extrapolated frame 43, the motion vectors are determined for each block 44 in raster order, starting from the top left. Thus, when the block 47 at the centre of the extrapolated frame 43 is reached, the motion vectors for a number of other blocks 44 in the extrapolated frame 43 have been determined already. In particular, the three ("spatially") adjacent blocks $S_1$, $S_2$, $S_3$ in the row above the central block 47 and the block $S_4$ to the immediate left of the central block 47 have had motion vectors determined for them already for the extrapolated frame 43. In addition, the three ("temporally") adjacent blocks $T_3$, $T_4$, $T_5$ in the row below the central block 47, the block $T_2$ to the immediate right of the central block 47, and the central block $T_1$ itself have had motion vectors determined for them already for the previous extrapolated frame 43.

Examples of these motion vectors, pointing to their respective locations in the current frame 41 (and then to the previous frame 42), are shown in the current frame 41 in FIG. 9. The corresponding block 52 at the null motion vector of the current frame 41 is shown with locations to which the motion vectors for the spatially and temporally neighbouring blocks point (but pointing from the central block 47 in the extrapolated frame) $S_1$-$S_4$, $T_1$-$T_5$.

As can be seen, these motion vectors point to locations that would not necessarily have been searched simply by searching around the null motion vector in the current frame 41 (and the previous frame 42). Thus, by using these previously determined motion vectors, it may be more likely that the corresponding object, which has moved to the block in the extrapolated frame for which the motion vector is being determined, will be found in the current and previous frames 41, 42 (assuming that an object continues along a trajectory similar to that determined previously).

The process of using these previously determined motion vectors to determine the motion vector for the block 47 of the extrapolated frame 43 will now be described with reference to the flow chart of FIG. 5*b*. This process is performed after a search has been performed for a motion vector around the null motion vector in the current and previous frames 41, 42 (as was described with reference to the flow chart of FIG. 5*a*). When the search has not been terminated early (step 105, FIG. 5*a*) and there are no further locations to search (step 107, FIG. 5*a*), the motion vector having the lowest error from the search around the null motion vector is saved (step 108, FIG. 5*a*). The process then moves on to using previously determined motion vectors.

First, a check is made to see if there are any previously determined motion vectors available (step 109, FIG. 5*b*). When there are not, the saved motion vector found from searching around the null motion vector with the lowest error is stored to the motion vector field (MVF) for use as the selected motion vector for the block (step 110, FIG. 5*b*).

If there are previously determined motion vectors available, then a search (e.g. a full search, as outlined above, with reference to FIG. 7) around one of these candidate motion vectors is performed. When (in a similar manner as was outlined above with respect to the searching around the null motion vector), as part of this searching, a motion vector between the current and previous frames 41, 42 from the extrapolated frame 43 results in the error metric (e.g. calculated using the sum of absolute differences (SAD) between the image data in the current and previous frames 41, 42 for the motion vector being assessed) having a value below a particular threshold, the search is terminated (step 112, FIG. 5*b*), e.g. before all of the candidate (spatial and temporal) motion vectors have been searched around. When the search is terminated in this way, the motion vector resulting in this error below the threshold is saved (step 113, FIG. 5*b*) and stored to the motion vector field (MVF) for use as the selected motion vector for the block (step 110, FIG. 5*b*).

If the search is not terminated in this way, the errors calculated for the blocks of image data being compared in the current and previous frames 41, 42 using the motion vectors being tested as part of the search around the previously determined candidate motion vector are compared with each other and against previously calculated errors for other motion vectors that have been tested (step 114, FIG. 5*b*). If one of these motion vectors returns the lowest error calculated thus far, the motion vector resulting in this error is saved (step 115, FIG. 5*b*).

If none of these motion vectors returns the lowest error calculated thus far, the process is repeated for the next available previously determined candidate motion vector (step 109, FIG. 5*b*), with a search being performed around each of these candidate motion vectors (step 111, FIG. 5*b*). Once all the previously determined candidate motion vectors that are to be included in the search have been tested, the motion vector returning the lowest SAD error between the image data in the current and previous frames 41, 42 is stored to the motion vector field (step 110, FIG. 5*b*), unless the search is terminated early when testing one of these motion vectors (step 112, FIG. 5*b*).

The whole of the above process is then repeated for each of the remaining blocks 44 in the extrapolated frame 43 (steps 116, 118, FIG. 5*b*). This results in a motion vector for each block (and thus a motion vector field for the extrapolated frame 43 as a whole) being determined that points back through the current frame 41 to the previous frame 42. The motion vector field allows the extrapolated frame 43 to be constructed. This motion vector field for the extrapolated frame 43 is stored in the frame buffer 36 in memory (step 117, FIG. 5*b*).

In the above discussion, e.g. with reference to FIGS. 4 and 6, the size of the block in the extrapolated frame 43 for which a motion vector is determined is assumed to be a fixed size, e.g. the same size for all of the blocks in the extrapolated frame 43. However, this need not (and in some embodiments is not) the case. In some embodiments, as will now be described with reference to FIGS. 10 and 11, the size of the blocks may be varied.

Figure 10:
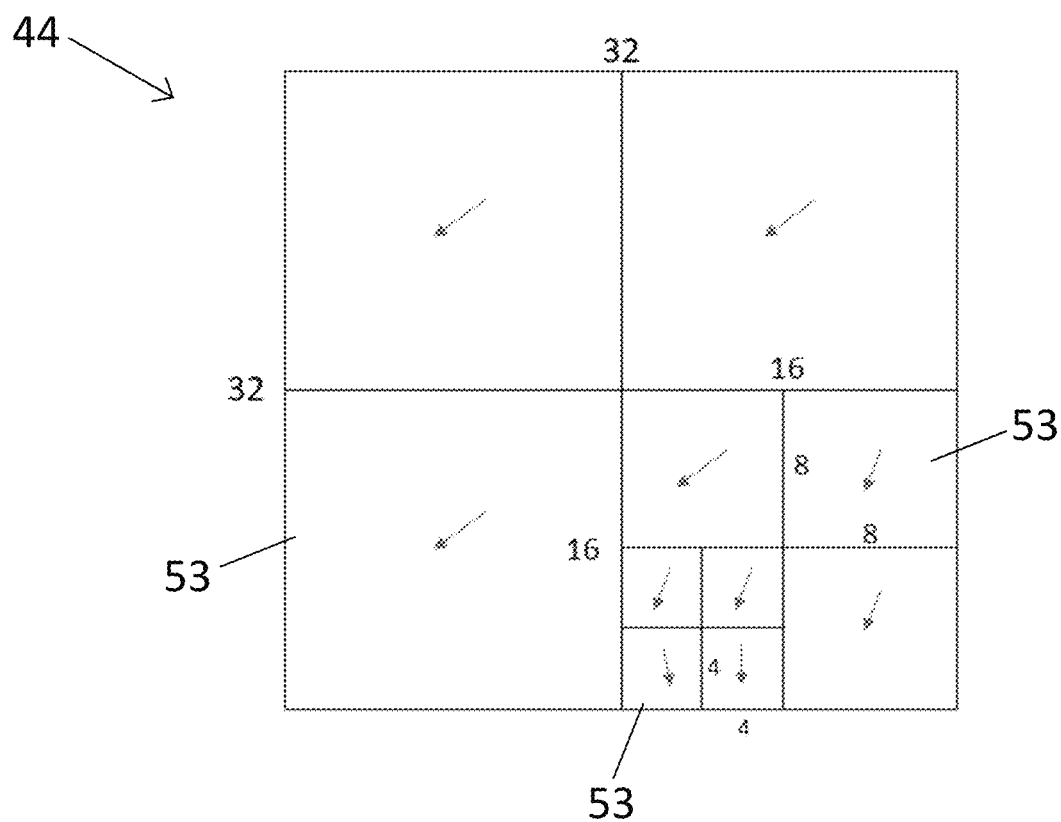
FIG. 10 shows a region of an extrapolated frame being divided into sub-blocks for the purpose of determining motion vectors according to an embodiment of the technology described herein.

FIG. 10 shows how a large block of an extrapolated frame, for which motion estimation is to be performed, may be split up into multiple smaller blocks for the purpose of performing the motion estimation.

For a block 44 of an extrapolated frame, the default size for performing motion estimation may be 32 by 32 pixels, as shown in FIG. 10. However, as part of the motion estimation process, the block 44 may be split up into smaller sub-blocks 53, e.g. of sizes 16 by 16 pixels, 8 by 8 pixels and down to 4 by 4 pixels. Each of these smaller blocks, as appropriate, may then be used (by searching in corresponding blocks in the current and previous frames) to determine the motion vectors for the respective blocks. The size of block (or combination of sizes for multiple smaller blocks) that provides the smallest error metric may be chosen for the block 44 of the extrapolated frame.

Figure 11:
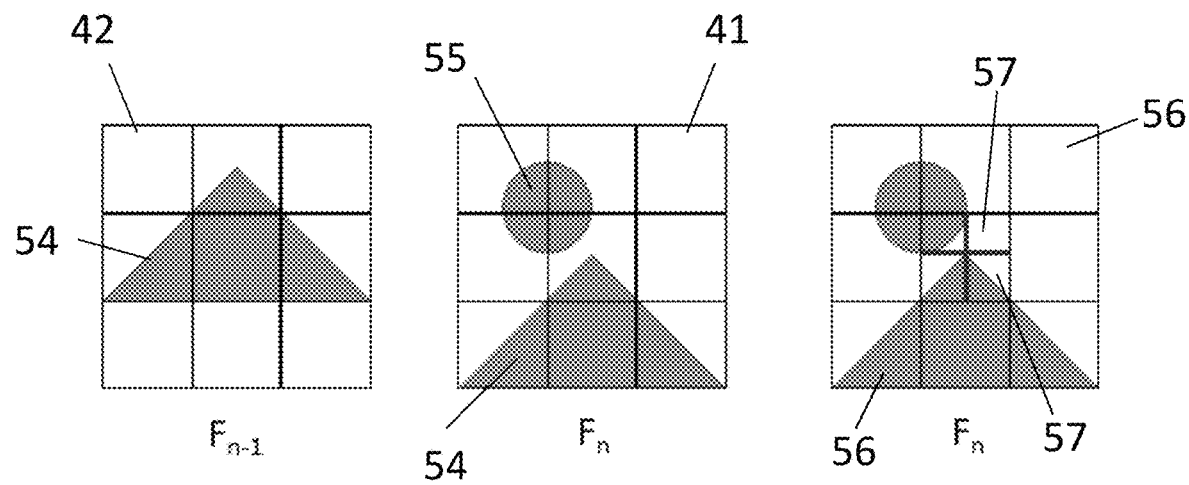
FIG. 11 shows a process of dividing a region of an extrapolated frame for identifying object motion of objects in the region according to an embodiment of the technology described herein.

As will be appreciated, it may be important to identify actual objects in a sequence of frames of image data in order to account for the relative motion of objects in the sequence. Such motion may, for example, lead to occlusions, such that an object visible in one frame may not be visible in the next. The identification of a particular object will be illustrated with reference to FIG. 11. FIG. 11 shows how splitting up a block may improve the accuracy of the motion estimation process.

In the previous frame $F_{n-1}$ 42, a triangular object 54 is displayed straddling multiple blocks of the frame. In the current frame $F_n$ 41, the triangle 54 has moved down relative to its position in the previous frame $F_{n-1}$ 42 and a circular object 55, not visible in the previous frame $F_{n-1}$ 42, has appeared close to the triangle 54.

It can be seen that the whole of the area (i.e. the nine sub-blocks) surrounding the triangle in the current and previous frames 41, 42 to be used as the block for the purpose of the motion estimation process (i.e. defined in the extrapolated frame and then projected through to the current and previous frames 41, 42), this may encounter some difficulties when calculating the error metric owing to the presence of the circular object 55 in the current frame $F_n$ 41 that was not visible in the previous frame $F_{n-1}$ 42. However, when the approach outlined in FIG. 10 is used of splitting up a larger block into smaller sub-blocks is used, this helps to resolve these problems.

As can be seen in the right-hand version of the current frame $F_n$ 41 shown in FIG. 11, when the region of the current frame $F_n$ 41 shown is split up into eight outer sub-blocks 56 and four central smaller sub-blocks 57, this helps to isolate the triangular object 54 from the circular object 55. Then, when these sub-blocks 56, 57 are used for the purpose of the motion estimation process, it is more likely that they will be able to find the correct motion vector for these sub-blocks 56, 57.

This process of splitting up a block of an extrapolated frame into multiple smaller blocks for the purpose of performing the motion estimation may be incorporated into the motion estimation process shown in FIGS. 5a and 5b. For example, in the same way in which different candidate motion vectors are used to determine the lowest error metric for particular corresponding blocks in the current and previous frames, differently sized blocks of the extrapolated frame may be tested to determine which size (or combination of sizes for multiple smaller blocks) provides the smallest error. This size (or combination of sizes) may then be used to determine the motion vector(s) for that region of the extrapolated frame.

Once the motion vectors for an extrapolated frame has been determined, the motion vector field as a whole (or at least groups of motion vectors) may be analysed, using a vector median filter, to identify and correct anomalous motion vectors in the motion vector field. This process will now be described with reference to FIG. 12.

Figure 12:
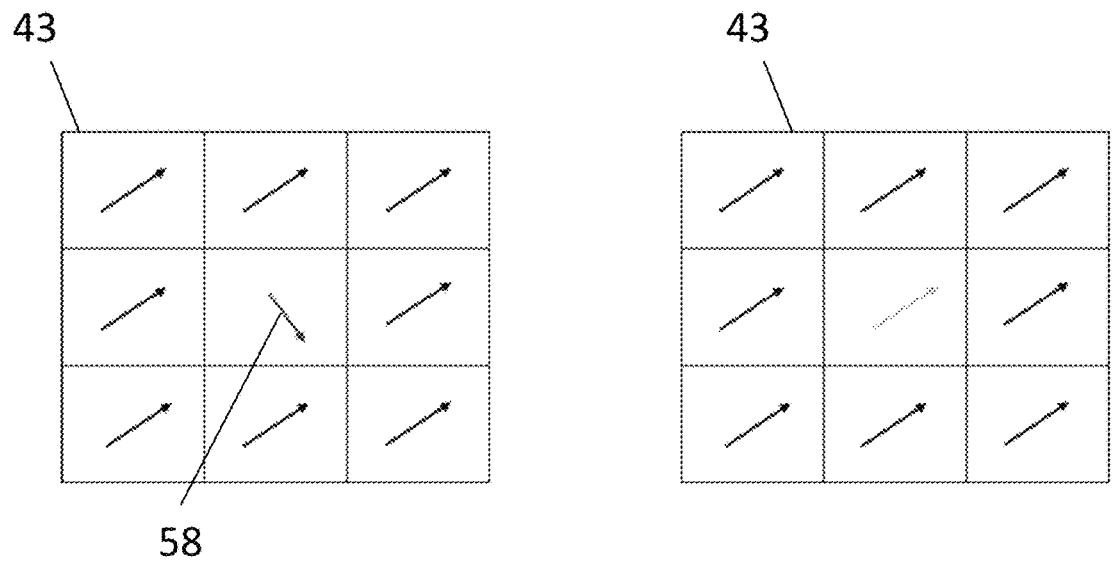
FIG. 12 shows a vector median filter being applied to a motion vector field according to an embodiment of the technology described herein.

FIG. 12 shows a motion vector field that has been determined for an extrapolated frame 43. The "raw" motion vector field is shown in the left hand version of the extrapolated frame 43. It can be seen that the motion vectors determined for the extrapolated frame 43 all point in the same direction, apart from the motion vector 58 at the centre of the extrapolated frame 43 which thus looks to be an anomaly that may need correcting.

A vector median filter is applied to the motion vector field of the extrapolated frame 43 to identify and correct the motion vector 58 at the centre of the extrapolated frame 43, e.g. so that it points in the same direction as the other motion vectors, as shown in the right hand version of the extrapolated frame 43. The vector median filter may take into account the SAD values of the comparisons between the blocks in the current and previous frames 41, 42 when determining the motion vectors in order to avoid correcting motion vectors that at first appear to be anomalous but in fact have been determined with a high degree of confidence.

After the motion vector field for an extrapolated frame has been determined, corrected and stored, it can then be used to construct the extrapolated frame (e.g. when the extrapolated frame is desired to be displayed), in a process known as motion compensation. This process uses the image data from the previous and current frames 42, 41, along with the determined motion vector field (which indicates the motion of objects between the previous and current frames 42, 41), to determine the location of objects in the extrapolated frame, and will now be described with reference to FIG. 5c.

The motion vector field that has been stored to memory (step 117, FIG. 5b) is used to correct any anomalous motion vectors using a vector median filter (step 119, FIG. 5c), which are then stored back in memory. The motion compensation process may then begin.

For a block in the extrapolated frame 43 to be constructed, the motion compensation process is started (step 120, FIG. 5c) by the (corrected) motion vector field (MVF) being loaded from memory (e.g. into local memory of the display processing unit 34) (step 121, FIG. 5c). The motion vector of the motion vector field that has been determined for this block of the extrapolated frame 43 is used, with the image data of the current rendered frame 41 (and, in some embodiments, also the image data of the previous rendered frame 42), to construct the extrapolated frame 43 (step 122, FIG. 5c). This is done by extrapolating the image data from a block of the current rendered frame 41, using the motion vector determined for the block of the extrapolated frame 43, to the block of the extrapolated frame 43.

This process is repeated for each of the blocks of the extrapolated frame 43, when the required block of image data of the current rendered frame 41 is available (step 123, FIG. 5c) such that the motion compensation process can be performed for this block (step 124, FIG. 5c). This continues until all the blocks of the extrapolated frame 43 have been constructed (step 125, FIG. 5c), such that the extrapolated frame 43, which now is formed as a frame of image data in the same manner as the rendered frames, can be output for display. The whole process (of motion estimation and motion compensation) may then be repeated for subsequent frames in the sequence of frames.

It will be appreciated from the above that the technology described herein, in embodiments at least, comprises an improved method of and apparatus for generating an extrapolated frame to insert into a sequence of rendered or decoded frames, e.g. to increase the display rate for head mounted displays. This is achieved, in embodiments of the technology described herein at least, by comparing regions of previously rendered frames and extrapolating the object motion to the extrapolated frame. The foregoing detailed description has be described with reference primarily to a sequence of rendered frames. However, it will be understood that the process of motion estimation and motion compensation may be applied in the same manner to a sequence of decoded frames. For example, encoded video data may be decoded by the video engine 1 to produce the sequence of encoded frames of video data that are then processed by the GPU 2 as outlined above.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processing system that renders or decodes a sequence of frames each representing a view of a scene of one or more objects, and generates extrapolated frames for inclusion in the sequence of rendered or decoded frames by extrapolating object motion from rendered or decoded frames of the sequence of frames, the method comprising:
   generating an extrapolated frame for inclusion in the sequence of frames by extrapolating object motion from first and second rendered or decoded frames in the sequence of rendered or decoded frames to the extrapolated frame, wherein the extrapolated frame is to be included in the sequence of rendered or decoded frames after the first and second frames, by:
      for each of one or more regions of a set of regions that the extrapolated frame is divided into for the purpose of generating the extrapolated frame:
         determining a motion vector to use for generating the region of the extrapolated frame from the first and second frames by, for each of one or more candidate motion vectors extending from the region of the extrapolated frame through a region of the first frame to a region of the second frame:
            comparing the region of the first frame intersected by the candidate motion vector with the region of the second frame intersected by the candidate motion vector;
            determining a measure of the similarity of the region of the first frame intersected by the candidate motion vector to the region of the second frame intersected by the candidate motion vector using the comparison;
         selecting one of the tested candidate motion vectors as the motion vector to use when generating the region of the extrapolated frame from the first and second frames based on the determined similarity measures for the tested candidate motion vectors; and
         storing an indication representative of the selected candidate motion vector for use when generating the extrapolated frame from the first and second frames.

2. The method as claimed in claim 1, wherein the method comprises testing a plurality of candidate motion vectors, wherein the plurality of candidate motion vectors comprise the null motion vector that points to the same region in the first and second frames as the region of the extrapolated frame and one or more candidate motion vectors around the null motion vector.

3. The method as claimed in claim 1, wherein the method comprises testing one or more candidate motion vectors comprising one or more previously determined motion vectors for the extrapolated frame or for a previously generated extrapolated frame.

4. The method as claimed in claim 3, wherein the one or more previously determined motion vectors have been determined previously for one or more different respective regions of the same extrapolated frame that are adjacent to the region of the extrapolated frame for which the motion vector is being determined, or wherein the one or more previously determined motion vectors have been determined previously for the same region of the previous extrapolated frame as, or for regions of the previous extrapolated frame that are adjacent to the region of, the extrapolated frame for which the motion vector is being determined.

5. The method as claimed in claim 3, wherein the method comprises testing one or more candidate motion vectors around the one or more previously determined motion vectors.

6. The method as claimed in claim 1, wherein the similarity measure comprises an error value, and the method comprises selecting the candidate motion vector being tested as the motion vector to use for generating the region of the extrapolated frame when the error value is less than a particular threshold.

7. The method as claimed in claim 1, wherein the method comprises dividing the region of the extrapolated frame into a plurality of sub-regions and testing one or more candidate motion vectors for each of the plurality of sub-regions.

8. The method as claimed in claim 7, wherein the method comprises selecting one of the candidate motion vectors tested for each sub-region of the extrapolated frame to use as the motion vector for generating the sub-region of the extrapolated frame or selecting one of the candidate motion vectors tested for the region of the extrapolated frame to use as the motion vector when generating the region of the extrapolated frame, based on the determined similarity measures for the tested candidate motion vectors for the region and sub-regions.

9. The method as claimed in claim 1, wherein the method comprises, for a motion vector selected to use for generating a region of the extrapolated frame, comparing the motion vector with one or more other motion vectors determined for the extrapolated frame to determine whether the motion vector is consistent with the one or more other motion vectors.

10. A graphics processing system comprising:
    a processing circuit operable to render or decode a sequence of frames each representing a view of a scene of one or more objects, and generate extrapolated frames for inclusion in the sequence of rendered Fframes by extrapolating object motion from rendered or decoded frames of the sequence of frames; and
    a processing circuit operable to generate an extrapolated frame for inclusion in the sequence of frames by extrapolating object motion from first and second rendered or decoded frames in the sequence of rendered or decoded frames to the extrapolated frame, wherein the extrapolated frame is to be included in the sequence of rendered or decoded frames after the first and second frames, by:

for each of one or more regions of a set of regions that the extrapolated frame is divided into for the purpose of generating the extrapolated frame:
  determining a motion vector to use for generating the region of the extrapolated frame from the first and second frames by, for each of one or more candidate motion vectors extending from the region of the extrapolated frame through a region of the first frame to a region of the second frame:
    comparing the region of the first frame intersected by the candidate motion vector with the region of the second frame intersected by the candidate motion vector;
    determining a measure of the similarity of the region of the first frame intersected by the candidate motion vector to the region of the second frame intersected by the candidate motion vector using the comparison;
    selecting one of the tested candidate motion vectors as the motion vector to use when generating the region of the extrapolated frame from the first and second frames based on the determined similarity measures for the tested candidate motion vectors; and
    storing an indication representative of the selected candidate motion vector for use when generating the extrapolated frame from the first and second frames.

11. The graphics processing system as claimed in claim 10, wherein the processing circuit is operable to test a plurality of candidate motion vectors, wherein the plurality of candidate motion vectors comprise the null motion vector that points to the same region in the first and second frames as the region of the extrapolated frame and one or more candidate motion vectors around the null motion vector.

12. The graphics processing system as claimed in claim 10, wherein the processing circuit is operable to test one or more candidate motion vectors comprising one or more previously determined motion vectors for the extrapolated frame or for a previously generated extrapolated frame.

13. The graphics processing system as claimed in claim 12, wherein the one or more previously determined motion vectors have been determined previously for one or more different respective regions of the same extrapolated frame that are adjacent to the region of the extrapolated frame for which the motion vector is being determined, or wherein the one or more previously determined motion vectors have been determined previously for the same region of the previous extrapolated frame as, or for regions of the previous extrapolated frame that are adjacent to the region of, the extrapolated frame for which the motion vector is being determined.

14. The graphics processing system as claimed in claim 12, wherein the processing circuit is operable to test one or more candidate motion vectors around the one or more previously determined motion vectors.

15. The graphics processing system as claimed in claim 10, wherein the similarity measure comprises an error value, and the processing circuit is operable to select the candidate motion vector being tested as the motion vector to use for generating the region of the extrapolated frame when the error value is less than a particular threshold.

16. The graphics processing system as claimed in claim 10, wherein the processing circuit is operable to divide the region into a plurality of sub-regions and test one or more candidate motion vectors for each of the plurality of sub-regions.

17. The graphics processing system as claimed in claim 16, wherein the processing circuit is operable to select one of the candidate motion vectors tested for each sub-region of the extrapolated frame to use as the motion vector for generating the sub-region of the extrapolated frame or selecting one of the candidate motion vectors tested for the region of the extrapolated frame to use as the motion vector when generating the region of the extrapolated frame, based on the determined similarity measures for the tested candidate motion vectors for the region and sub-regions.

18. The graphics processing system as claimed in claim 10, wherein the processing circuit is operable to, for a motion vector selected to use for generating a region of the extrapolated frame, compare the motion vector with one or more other motion vectors determined for the extrapolated frame to determine whether the motion vector is consistent with the one or more other motion vectors.

19. A non-transitory computer readable storage medium storing computer software code which when executing on a data processor performs a method of operating a graphics processing system that renders or decodes a sequence of frames each representing a view of a scene of one or more objects, and generates extrapolated frames for inclusion in the sequence of rendered or decoded frames by extrapolating object motion from rendered or decoded frames of the sequence of frames, the method comprising:
  generating an extrapolated frame for inclusion in the sequence of frames by extrapolating object motion from first and second rendered or decoded frames in the sequence of rendered or decoded frames to the extrapolated frame, wherein the extrapolated frame is to be included in the sequence of rendered or decoded frames after the first and second frames, by:
    for each of one or more regions of a set of regions that the extrapolated frame is divided into for the purpose of generating the extrapolated frame:
      determining a motion vector to use for generating the region of the extrapolated frame from the first and second frames by, for each of one or more candidate motion vectors extending from the region of the extrapolated frame through a region of the first frame to a region of the second frame:
        comparing the region of the first frame intersected by the candidate motion vector with the region of the second frame intersected by the candidate motion vector;
        determining a measure of the similarity of the region of the first frame intersected by the candidate motion vector to the region of the second frame intersected by the candidate motion vector using the comparison;
      selecting one of the tested candidate motion vectors as the motion vector to use when generating the region of the extrapolated frame from the first and second frames based on the determined similarity measures for the tested candidate motion vectors; and
      storing an indication representative of the selected candidate motion vector for use when generating the extrapolated frame from the first and second frames.

* * * * *

UNITED STATES PATENT AND TRADEMARK OFFICE
CERTIFICATE OF CORRECTION

PATENT NO.      : 10,861,167 B2
APPLICATION NO. : 16/279849
DATED           : December 8, 2020
INVENTOR(S)     : Ozgur Tasdizen It is certified that error appears in the above-identified patent and that said Letters Patent is hereby corrected as shown below:

In the Claims

Column 32, Line 58 (Claim 10, Line 6) please change "Fframes by" to -- frames by --

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*